(12) United States Patent
Rozzi

(10) Patent No.: US 6,633,408 B1
(45) Date of Patent: Oct. 14, 2003

(54) SPECTRAL MODELING OF PHOTOGRAPHIC PRINTING BASED ON DYE CONCENTRATION

(75) Inventor: William A. Rozzi, West Lakeland Township, MN (US)

(73) Assignee: Kodak Polychrome Graphics, LLC, Norwalk, CT (US)

( * ) Notice: Subject to any disclaimer, the term of this patent is extended or adjusted under 35 U.S.C. 154(b) by 0 days.

(21) Appl. No.: 09/342,568

(22) Filed: Jun. 29, 1999

(51) Int. Cl.$^7$ .......................... H04N 1/407; H04N 1/50; H04N 1/60

(52) U.S. Cl. ..................... 358/1.9; 358/518; 358/521; 358/504; 358/506

(58) Field of Search ..................... 358/1.9, 504, 518, 358/521, 506, 527

(56) References Cited

U.S. PATENT DOCUMENTS

| 4,500,919 A | 2/1985 | Schreiber |
| 4,658,286 A | 4/1987 | Schwartz et al. |
| 4,951,084 A | 8/1990 | von Stein et al. |
| 4,970,584 A | 11/1990 | Sato et al. |
| 4,975,737 A | 12/1990 | Murooka et al. |
| 4,977,522 A | 12/1990 | David |
| 5,003,500 A | 3/1991 | Gerber |
| 5,149,960 A | 9/1992 | Dunne et al. ............... 250/226 |
| 5,157,506 A | 10/1992 | Hannah |
| 5,255,083 A | 10/1993 | Capitant et al. |
| 5,337,130 A | 8/1994 | Satoh |
| 5,361,331 A | * 11/1994 | Schmerler et al. ........... 358/1.9 |
| 5,377,025 A | 12/1994 | Spaulding et al. .......... 358/518 |
| 5,521,723 A | 5/1996 | Madden et al. ............. 358/518 |
| 5,543,940 A | 8/1996 | Sherman .................... 358/518 |
| 5,579,132 A | 11/1996 | Takahashi et al. .......... 358/527 |
| 5,790,280 A | 8/1998 | Terashita .................... 358/501 |

FOREIGN PATENT DOCUMENTS

WO    WO 89/03062    6/1989

OTHER PUBLICATIONS

Allen E, "Colorant Formulation and Shading," in Optical Radiation Measurements, vol. 2, Chapter 7, F. Grum and C.J. Bartelson, eds., Academic Press, New York, pp. 289–336 (1980).

Berns RS and Shyu MJ, "Colorimetric Characterization of a Desktop Drum Scanner Using a Spectral Mode," J. Electronic Imaging 4(4):360–372 (1995).

Berns RS, "Colorimetric Characterization of Sharp JX610 Desktop Scanner," Munsell Color Science Laboratory Technical Report, Rochester Institute of Technology, pp. 1–19 (1993).

Berns RS, "Spectral Modeling of a Dye Diffusion Thermal Transfer Printer," J. Electronic Imaging 2(4):359–370 (1993).

(List continued on next page.)

*Primary Examiner*—Scott Rogers
(74) *Attorney, Agent, or Firm*—Shumaker & Sieffert, PA

(57) ABSTRACT

Predicting a reflectance spectrum of a photographic print based on data from a scanned color negative. The technique uses dye concentration, providing a channel-independent basis for the spectral model. The spectral model includes three conceptual sections: scanner and film models, a photographic printer model, and a photographic paper model. The scanner and film section converts digital data from a scan of a color negative on a calibrated scanner into predictions of the spectral transmittance for each pixel. The photographic printer section uses an exposure schedule and optionally a color temperature and computes the spectrum of the exposing illumination as a function of time. The photographic paper section converts the illuminated negative's spectral power first into dye concentration estimates and subsequently into a predicted reflectance spectrum for the simulated print.

50 Claims, 14 Drawing Sheets

OTHER PUBLICATIONS

Chang W and Milch JR, "A Model for Stimulating the Photographic Development Process on Digital Images," in Camera and Input Scanner Systems, Proceedings SPIE—The International Society for Optical Engineering, vol. 1448, San Jose, California (1991) (Best copy available).

Clapper FR, "Color Reproduction," in The Theory of the Photographic Process, pp. 561–577 (1977).

Gorokhovskii YN, "Spectral Studies," The Focal Press, London & New York (1965).

Gschwind R., "Stimulating and Optimizing the Color Reproduction of Photographic Materials," Color Imaging Systems, Royal Photographic Society Symposium, Cambridge, Sep. 1986, M.. Pointer, ed., pp. 4–10 (1987).

Hagan GT, "Resampling Methods for Image Manipulation," *The C Users Journal*, pp. 53–58 (1991).

Hamming RW, "Numerical Methods for Scientists and Engineers," 2nd Ed., pp. 657–676, Chapter 43, Optimization, Dover, New York (1973).

Hung P, "Colorimetric Calibration for Scanners and Media," *SPIE Camera and Input Scanner Systems* 1448:164–174 (1991).

Hunt RWG, "The Reproduction of Colour in Photography, Printing & Television," 4th Edition, Fountain Press, England, section 14.17, pp. 257–259 (1987).

Johnson T, "Methods for Characterizing Colour Scanners and Digital Cameras," *Displays* 16(4):183–191 (1996).

Kang HR, "Color Scanner Calibration," *J. Imaging Science and Technology* 36(2):162–170 (1992).

Malinowski ER and Howery DG, "Factor Analysis in Chemistry," John Wiley & Sons, New York, Chapters 1–5, pp. 1–117 (1980).

Mancill CE, "Digital Color Image Restoration," Ph.D. Thesis, University of Southern California, pp. 1–143 (1975).

Praefcke W, "Transform Coding of Reflectance Spectra Using Smooth Basis Vectors," *J. Imaging Science and Technology* 40(6):543–548 (1996).

Press WH et al., "Numerical Recipes in C," Second Edition, Cambridge University Press, p. 412–430 (1992).

Rodriquez MA, "Producing Colorimetric Data from Densitometric Scans," *SPIE* 1913:413–418 (1993).

Saunders AE, "Fitting the Photographic Characteristic Curve: A Functional Equation Approach," *J. Photographic Science* 41:186–193 (1993).

Sharma G and Trussell HJ, "Set Theoretic Estimation of Color Scanner Characterization," *J. Electronic Imaging* 5(4):479–489 (1996).

Sigg F, "Errors in Measuring Halftone Dot Areas," *J. Applied Photographic Engineering* 9(1):27–32 (1983).

Stokes M et al., "Colorimetrically Quantified Visual Tolerances for Pictorical Images," Proc. 1992, vol. 2: Technical Assoc. Graphics Arts and Inter–Society Color Council, Milton Pearson, ed., RIT Research Corporation, Rochester, New York, pp. 757–777 (1992).

Tuijn C, "Input Calibration for Negative Originals," *SPIE* 2414:76–83 (1995).

Viggiano JA, "Modeling the Color of Multi–Colored Halftones," *Proc. TAGA*, pp. 44–62 (1990).

Weisberg S, "Applied Linear Regression," Chapter 8, p. 190ff, John Wiley & Sons, New York, pp. 1–51 and 182–263 (1980).

Buchsbaum, G, "A Spatial Processor Model for Object Colour Perception" Journal of the Franklin Institute, US, Pergamon Press, Elmsfor, NY, vol. 310, No. 1, Jul. 1, 1980, pp. 1–27, XP000195823, ISSN: 0016–0032.

Chung, P, "Colorimetric Calibration for Scanners and Media" Proceedings of the SPIE, Feb. 27, 1991, XP000616908.

Jung et al, "An Alternative Method of Optoelectronic Color Analysis for Slides," Signal Processing, Image Communication, NL, Elsevier Science Publishers, Amsterdam, vol. 6, No. 1, Mar. 1, 1994, pp. 47–57, XP000429150, ISSN: 0923–5965.

* cited by examiner

| PERIOD | DURATION (ms) | FILTERING | | |
|---|---|---|---|---|
| | | CYAN | MAGENTA | YELLOW |
| 1 | 1.485401 | OUT | IN | IN |
| 2 | 3.769730 | IN | OUT | IN |
| 3 | 7.296930 | IN | IN | OUT |

SPECTRAL MODELING OF PHOTOGRAPHIC PRINTING BASED ON DYE CONCENTRATION

The present application is related to copending application Ser. No. 09/342,960 entitled "COLORIMETRIC CHARACTERIZATION OF SCANNED MEDIA USING SPECTRAL SCANNER AND MEDIA MODELS," to Rozzi, filed Jun. 29, 1999, and to copending application Ser. No. 09/342,983, entitled "COLORIMETRIC CHARACTERIZATION OF SCANNED MEDIA USING SPECTRAL SCANNER AND BASIS SPECTRA MODELS," to Rozzi, filed Jun. 29, 1999, both of which are incorporated herein by reference.

TECHNICAL FIELD

The invention relates to modeling photographic printing, and more particularly to modeling the process and apparatus for making a photographic print based on a photographic color negative.

BACKGROUND

Photographic printing produces a photographic print from a photographic negative. In the photographic printing process various factors combine to produce the resulting photographic print, including characteristics of the exposure illuminant and process, the print paper, and dyes. To accurately characterize a photographic print with a photographic printing model, each of these real aspects of the printing process needs to be modeled.

A scanner can be used to scan a photographic color negative and generate corresponding digital output values. Scanners produce digital output values to represent the spectral transmittance of an input sample. A typical scanner illuminates a transmissive target using a light source. The scanner integrates light that passes through the sample and passes through a set of spectrally selective filters. The integrated products may be modified by electronics and software to obtain digital output values. These digital output values can be combined with print and dye models to characterize photographic media. However, conventional photographic characterizations are based on density and are not channel independent. A channel independent characterization would provide a more flexible model.

In addition, different reflectance spectra can be perceived by the eye as the same color. Similarly, different spectra can produce the same digital values. This effect is called "metamerism." Metameric samples can produce different colorimetric response values when viewed or scanned under different viewing conditions. As a result, in modeling scanners, many different reflectance spectra can produce the same RGB values. To determine a more accurate estimate of a reflectance spectrum, it is desirable to limit the candidates to avoid metameric matches.

SUMMARY

The invention provides methods and apparatus implementing a technique for predicting a reflectance spectrum of a photographic print. The technique models the print based on data from a source image, such as a color negative or color positive. The technique is also applicable to modeling an output image on transmissive media. The data is preferably obtained from an image acquisition device such as a scanner or digital camera. The technique uses dye concentration, providing a channel-independent basis for the spectral model. When used in combination with a color management system, the technique allows for previewing or manipulation of photographic images or experimentation with photographic processes via simulation. The user can control the simulated processing with an exposure schedule and optional print illuminant color temperature that controls the exposure time and spectral content of the printing illuminant. The user can also control other aspects of the simulated processing by modifying parameters such as the color filters, the illuminant spectrum, and the spectral sensitivities or absorption spectra of the paper.

The preferred spectral model includes three conceptual sections: scanner and film models, a photographic printer model, and a photographic paper model. The scanner and film section converts digital data from a scan of a color negative on a calibrated scanner into predictions of the spectral transmittance for each pixel. In alternative implementations, the scanner model is replaced with alternative models of image acquisition devices. The photographic printer section uses an exposure schedule and optionally a color temperature and computes the spectrum of the exposing illumination as a function of time. The photographic paper section converts the illuminated negative's spectral power first into dye concentration estimates and subsequently into a predicted reflectance spectrum for the simulated print.

In general, in one aspect, the technique includes: converting digital values from scanning a photographic negative to a film transmittance spectrum using a photographic negative film model corresponding to a media of the photographic negative; estimating an exposure illumination spectrum over time using an exposure schedule; estimating paper spectral sensitivities of a photographic paper corresponding to the photographic print; integrating over time spectral products of the film transmittance spectrum, the exposure illumination spectrum, and the paper spectral sensitivities; converting the integrated spectral products into log integrated exposures; converting the log integrated exposures to dye concentrations; and converting the dye concentrations to a predicted reflectance spectrum.

Advantages that may be seen in implementations of the invention include one or more of the following: computation based on dye concentration is simple and direct; the predicted spectrum is an accurate model of photographic media and the development process; the model enables realistic proofing, preview, and global or selective manipulation of photographic images without physically exposing and developing a photographic print from a negative; experimentation with new algorithms for automatic color correction and investigation of material properties or printer characteristics are facilitated; and the determination of complex parameters is improved by using targets which are easy to produce and measure. Furthermore, given accurate parameters in the model, physical constraints of the photographic printing process may be relaxed and images better than those which are produced via analog printing may be obtained. For example, adjusting exposure range compression can avoid blocked-up shadows and burned-out highlights, and exposures that ignore secondary effects can result in more vibrant images. In addition, the simulated processing can be implemented as a computer program to provide a virtual photographic printer apparatus, complete with software controls mimicking those of real apparatus.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 11 is an example of an exposure schedule.

Like reference numbers and designations in the various drawings indicate like elements.

DETAILED DESCRIPTION

Figure 1:
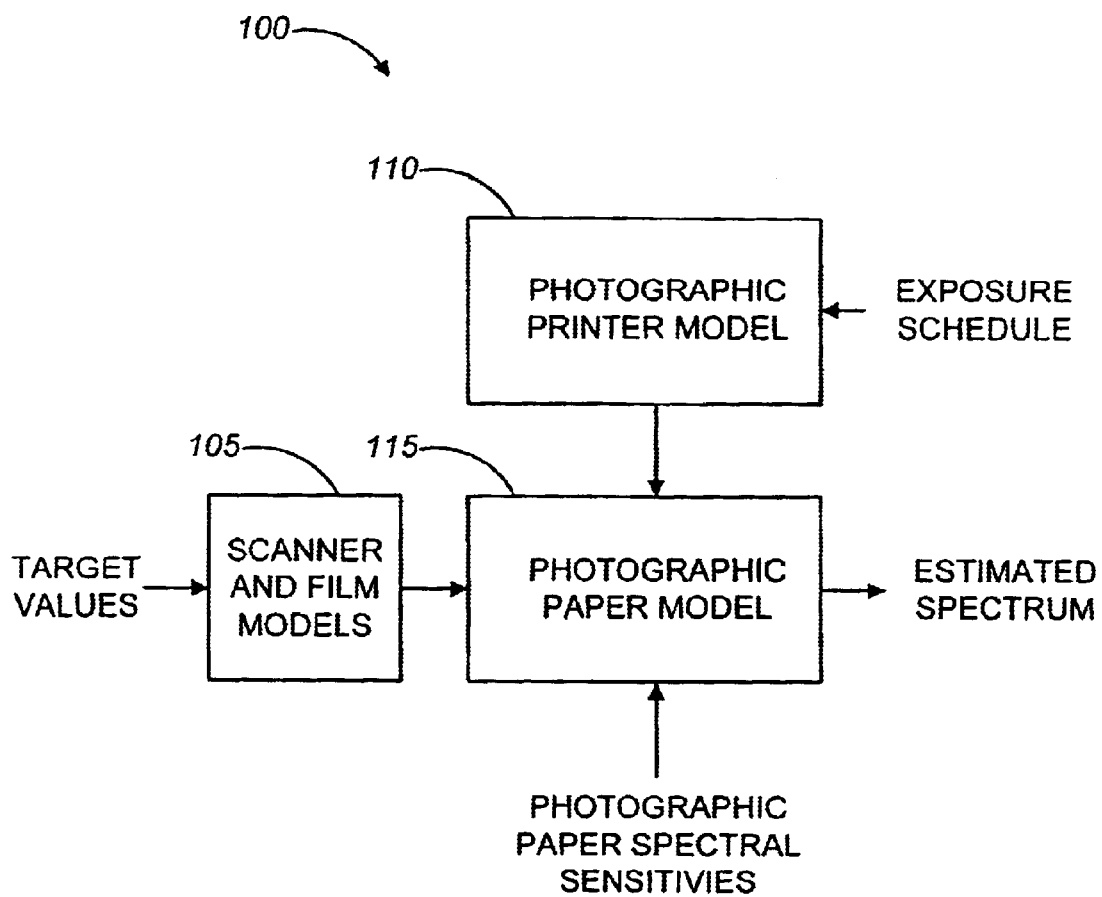
FIG. 1 is a block diagram of interaction of models according to an embodiment of the invention.

In one embodiment of the invention, a computer system predicts the reflectance spectrum of a photographic print based on a photographic negative. As shown in FIG. 1, in a spectral model 100 of a photographic printing process, the computer system employs scanner and film models 105, a photographic printer model 110, and a photographic paper model 115. The models 105, 110, 115 can be implemented as logically or physically separate components or can be implemented as a single component where the models are distinct only as abstractions. As a result, the allocation of calculations and equations described below is one exemplary implementation among numerous possibilities. The scanner and film models receive target digital values produced by scanning the photographic negative (i.e., acquiring and processing image information based on spectral energy received from the illuminated sample) using a scanner (not shown) and convert those values, on a per-pixel basis, to a film transmittance spectrum. Alternatively, the scanner model 105 uses a color look-up table to determine the target digital values. In an alternative implementation, the scanner model 105 is replaced with a different model of an image acquisition device, such as a digital camera model or a different scanner model. Examples of other spectral scanner models include those described by R. S. Berns and M. J. Shyu in "Colorimetric Characterization of a Desktop Drum Scanner using a Spectral Model," Journal of Electronic Imaging, Vol. 4, No. 4, Oct. 1995, pp. 360–72; by Dunne et al., in U.S. Pat. No. 5,149,960, Sept. 1992; by C. E. Mancil, in Digital Color Image Restoration, Ph.D. thesis, Univ. of S. Calif., Aug. 1975; and by Sherman, in U.S. Pat. No. 5,543,940, Aug. 1996, the disclosures of which are incorporated herein by reference. In another alternative implementation, a transmission spectra corresponding to a color negative can be obtained by direct measurement, such as with a scanning transmissive spectrophotometer.

The photographic printer model 110 models the spectrum of an illuminant over time. The photographic printer model 110 estimates an exposure illumination spectrum over time according to an exposure schedule. The exposure schedule can be supplied by a user or determined automatically, such as by using statistics of the scanned negative data. The photographic paper model 115 models the dye absorption and reflectance of a particular photographic paper. The photographic paper model 115 converts the film transmittance spectrum, the exposure illumination spectrum, and paper spectral sensitivities corresponding to the photographic paper to dye concentrations. The photographic paper model 115 also converts the dye concentrations to a predicted reflectance spectrum. The predicted reflectance spectrum represents a reflectance spectrum of a photographic print which would result from developing the scanned photographic negative using the photographic printing device and paper modeled in the spectral model 100. Each of the models is described in more detail below.

Figure 2:
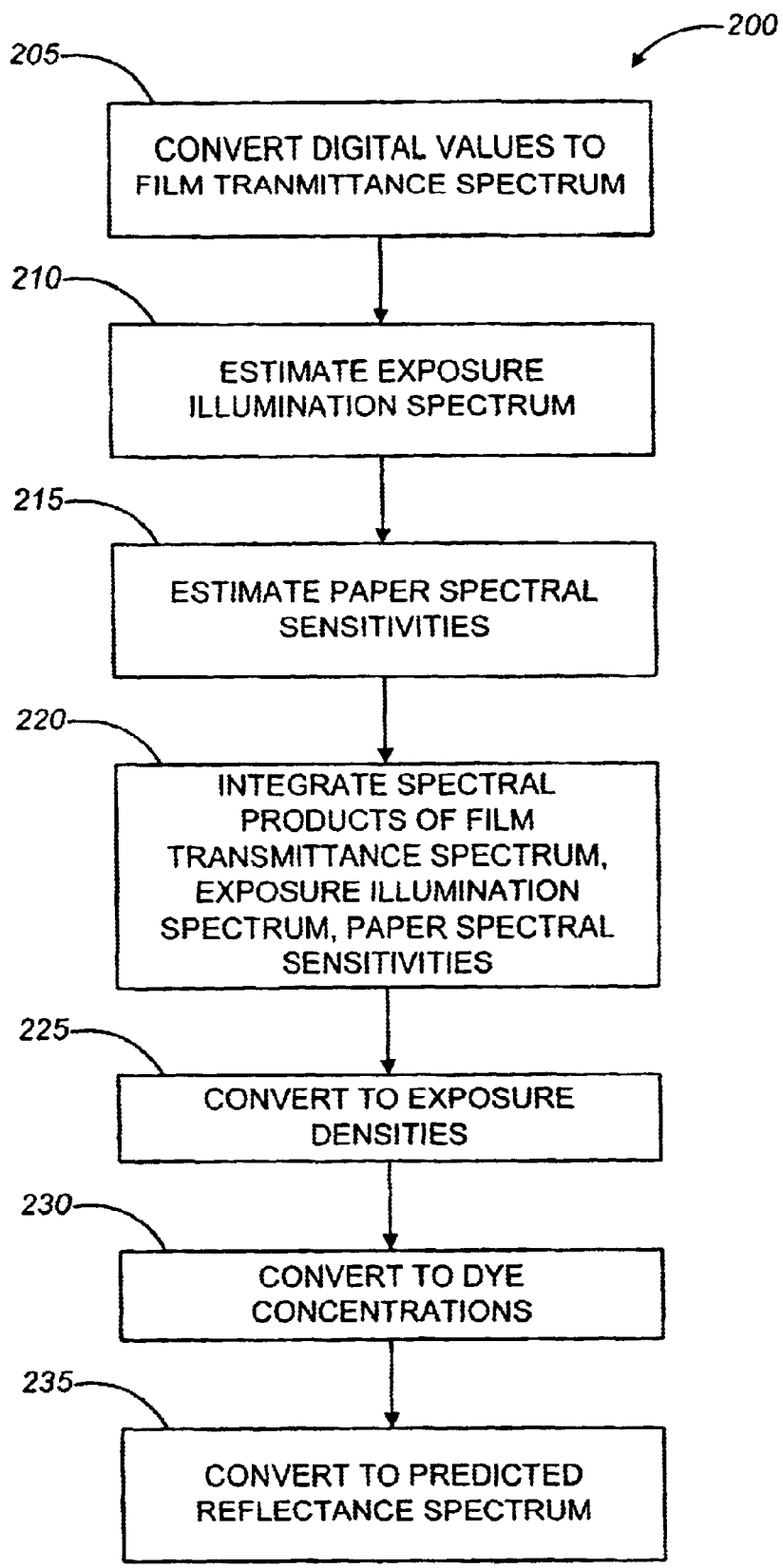
FIG. 2 is a flow chart of predicting a reflectance spectrum according to an embodiment of the invention.

As shown in FIG. 2, in a method 200 of predicting the reflectance spectrum of the photographic print, the computer system converts digital values from scanning the photographic negative to a film transmittance spectrum (step 205). The photographic negative is preferably a color negative, but alternatively can be a grayscale (e.g., black and white) negative, or color or grayscale positive. To convert the digital values, the computer system uses a photographic negative film model corresponding to the photographic negative media. The computer system uses a user-supplied exposure schedule and a model of a photographic printer to estimate an exposure illumination spectrum over time (step 210). The computer system may optionally also use a color temperature to estimate the exposure illumination spectrum. The computer system estimates paper spectral sensitivities corresponding to a photographic paper (step 215). Alternatively, the paper spectral sensitivities can be supplied or pre-determined. The computer system integrates spectral products of the film transmittance spectrum, the exposure illumination spectrum, and the paper spectral sensitivities (step 220). The computer system converts the integrated spectral products to log integrated exposures (step 225) and converts the log integrated exposures to dye concentrations (step 230). To complete the process, the computer system converts the dye concentrations to a predicted reflectance spectrum (step 235).

Scanner and Film Models

Figure 3:
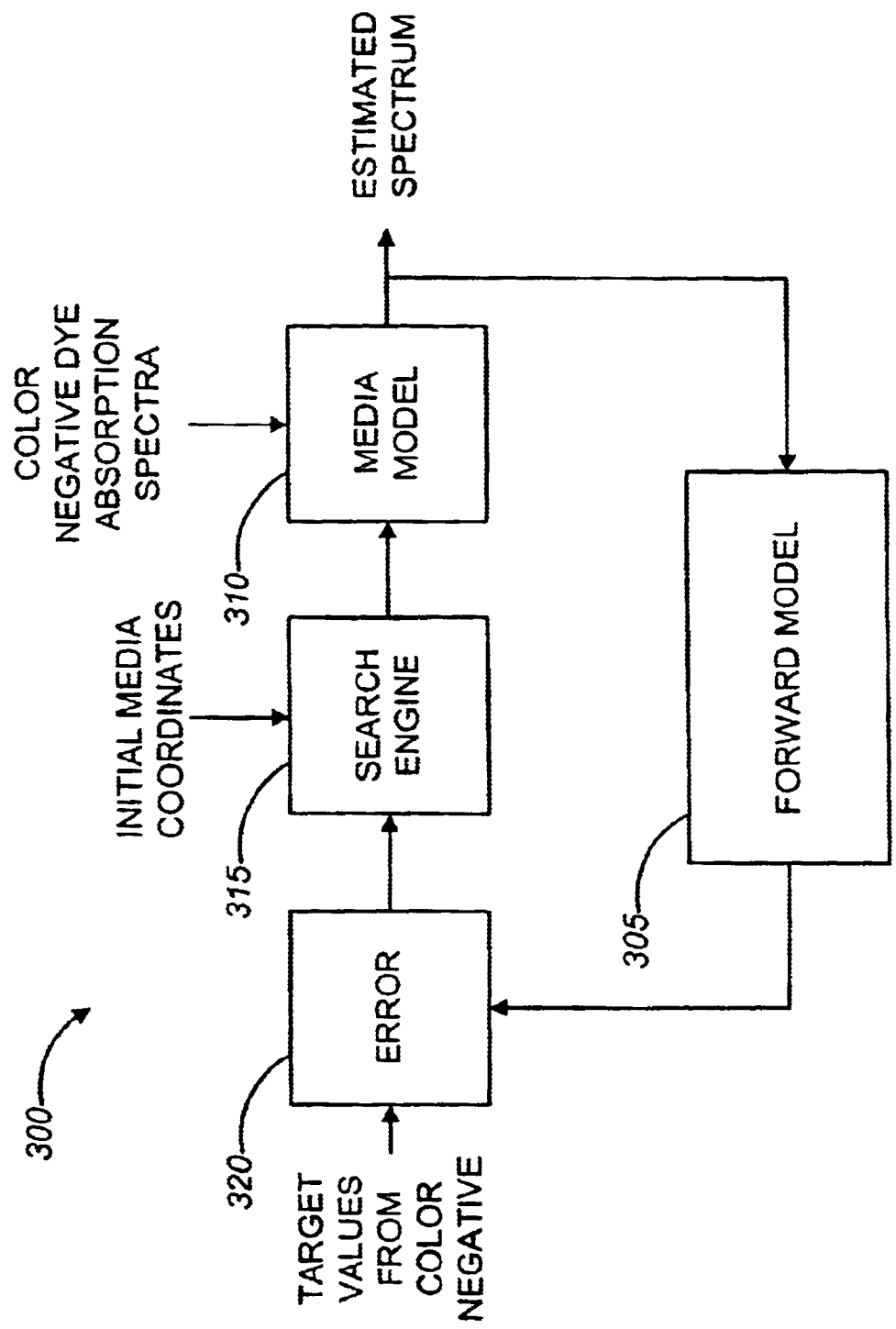
FIG. 3 is a block diagram of scanner and film models.

In one implementation of the models of the scanner and photographic negative, a computer system models the colorimetric behavior of a graphics arts scanner when scanning a sample, i.e., the photographic negative. As shown in FIG. 3, the computer system employs an inverse model 300 which converts target digital values from scanning a photographic color negative to an estimated spectrum. The scanner has at least one output channel (e.g., R, G, and B) and generates target digital values for each channel. The estimated spectrum can be an estimate of spectral reflectance or spectral transmittance, depending upon the application. The inverse model 300 includes a forward model 305 which estimates digital values for each channel of the scanner based on a supplied spectrum. The inverse model also includes a media model 310 particular to the media of the sample which translates media coordinates into an estimated spectrum. The media model can be for reflective or transmissive media. For a photographic color negative, the media model is a photographic color negative film model corresponding to the particular media of the photographic negative. The media model 310 receives color negative dye absorption spectra to model the dye absorption of the photographic negative. The negative dye absorption spectra can be supplied from the film manufacturer or estimated as described below. The inverse model 300 repeatedly estimates coordinates in a colorant space corresponding to the photographic negative using a search engine 315. The search engine 315 searches in the colorant space based on an error value 320 between target digital values from the scanner and estimated digital values from the forward model 305. The inverse model 300 converts estimated media coordinates to an estimated spectrum through the media model 310 and supplies the estimated spectrum to the forward model 305. The forward model 305 converts the supplied spectrum to estimated digital values. The inverse model 300 compares the estimated digital values to the target digital values to find the error value 320. If a stopping criterion or criteria have not been met, the search engine 315 searches for new media coordinates based on that error value 320 and the process repeats. The stopping criterion can be a specified tolerance for the error value 320, or alternatively can be a different criterion such as a number of iterations. When the stopping criterion has been met, the inverse model 300 recognizes that spectrum as the spectrum which sufficiently corresponds to the transmittance spectrum of the photographic negative.

Figure 4:
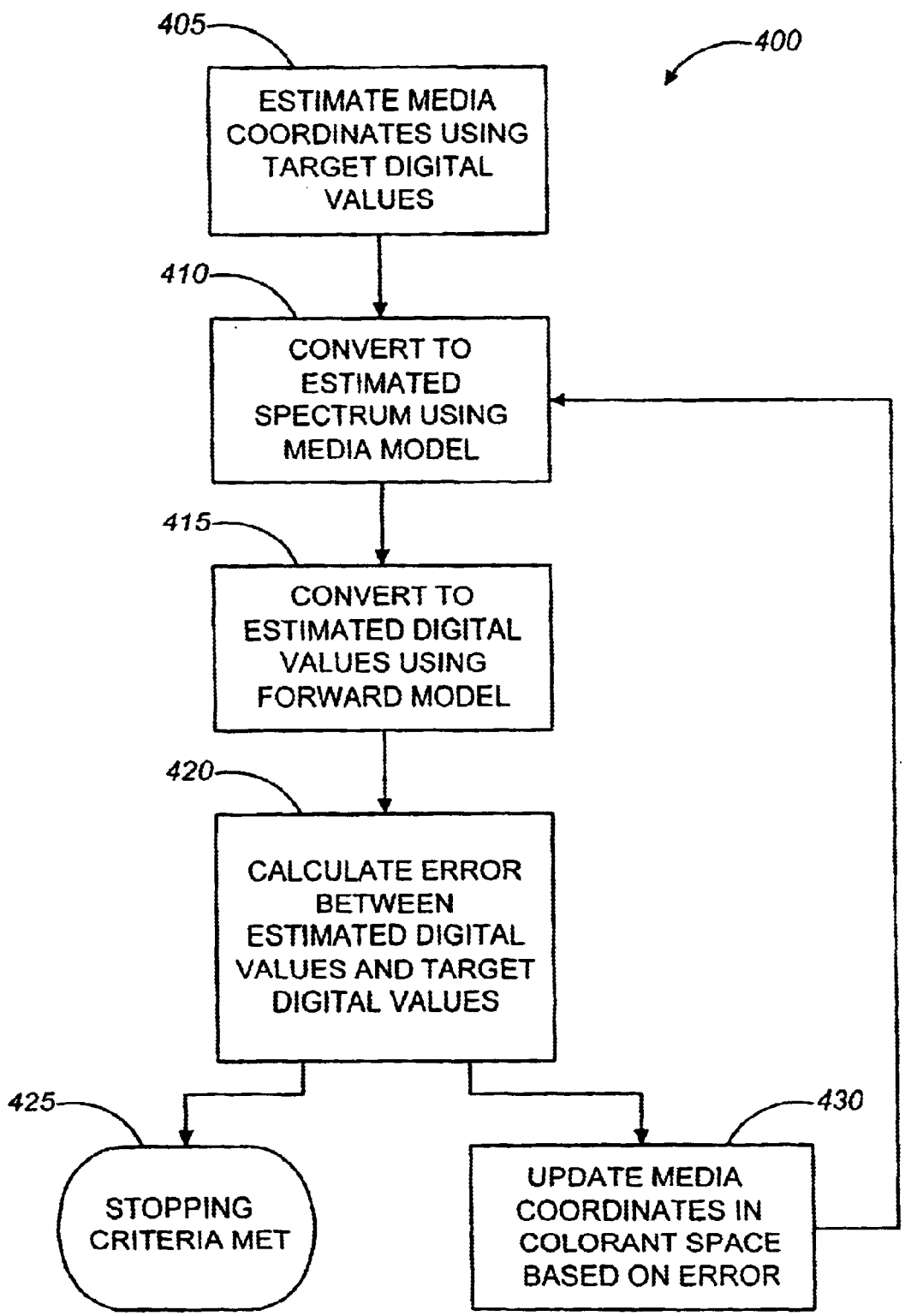
FIG. 4 is a flow chart of an inverse model of the scanner model.

As shown in FIG. 4, in a method 400 of modeling the spectral reflectance of a photographic negative as scanned by a scanner by identifying a predicted spectrum, a computer system estimates media coordinates in a colorant space of a media model corresponding to the photographic negative (step 405). The computer system estimates the media coordinates based on target digital values produced by the scanner. The estimated media coordinates are estimated to correspond to a spectrum which produces the target digital values. For example, the media coordinates for conventional color negative film represent the concentrations of cyan, magenta, and yellow dyes. The estimation of the initial media coordinates is not critical. The inverse model should converge to an acceptable solution even for "poor" initial estimates. The possibility of converging to an incorrect, metameric match is reduced, however, when the initial estimates are close to their final values. One process for estimating initial media coordinates uses constant initial values from the center of the valid ranges for the media coordinates. An alternative process uses the target RGB values from the scanner or their inverted values as the initial estimates. For example, in one implementation the media model represents media with cyan, magenta, and yellow dyes and all media coordinates and target device values are normalized to a range of zero to one. In this case, initial media coordinates can be computed as the inverted target RGB values:

$$C_O = 1 - R_{tgt}$$

$$M_O = 1 - G_{tgt}$$

$$Y_O = 1 - B_{tgt}$$

where $C_O$, $M_O$, and $Y_O$ are the initial estimated media coordinates and $R_{tgt}$, $G_{tgt}$, and $B_{tgt}$ are the target RGB values. Other processes for estimating the initial media coordinates are possible and should be obvious to one of ordinary skill in the art.

The computer system converts the estimated media coordinates to an estimated spectrum using a spectral media model (step 410). As noted above, the media model is specific to the media of the photographic negative. The computer system selects media coordinates which are within the colorant space of the media model. Accordingly, the media model limits the spectra under consideration and its use thus limits the resulting metamerism (i.e., different spectral values which appear to produce the same color to a particular viewer or device) in estimating the media coordinates. The media model reduces the metamerism problem by constraining the coordinates to compute spectra which are observable on the media according to supplied or measured dye absorption spectra for the film, eliminating from consideration metameric spectra which the media cannot produce. In addition, the media colorant space has fewer dimensions than a spectral measurement and so searching over the media colorant space is more efficient. For example, where the media colorant space is CMY, the media colorant space has three dimensions. A measured spectrum typically has a large number of spectral wavelengths or bands, such as 16, 31, or 36.

For color negative film, the media model uses the Beer-Bouguer theory to describe the relationship between dye concentration and spectral transmittance. The Beer-Bouguer theory is described by Berns. This model may be expressed as:

$$T_n(\lambda) = T_g(\lambda) \exp[-\{cK_c(\lambda) + MK_m(\lambda) + yK_y(\lambda)\}]$$

where c, m, and y are the dye concentrations, $\lambda$ represents wavelength, $K_c(\lambda)$, $K_m(\lambda)$, and $K_y(\lambda)$ are normalized spectral dye absorptivities, $T_g(\lambda)$ is the spectral transmittance of the film base, and $T_n(\lambda)$ is the spectral transmittance of a color patch. Unexposed film may not represent the true film base nor the maximum transmittance in a given spectral band due to the presence of masking couplers. Overmasking (i.e., film production defects that create the possibility, for example, for a strong red exposure to produce cyan dye concentration lower than that of the unexposed film base) and other effects may cause transmission in some spectral bands of particular colors to exceed that of the unexposed film. In evaluation of film models derived from either unexposed film or the maximum transmittance as the film base, however, there is little difference in their ability to reproduce measured color negative transmission spectra. Accordingly, the unexposed film transmission spectrum is preferred as the film base transmittance because the unexposed film transmission spectrum is smoother.

For media that are not digitally addressed, including color negative film, producing single-dye exposures for determination of each dye's absorption spectrum is often difficult. Statistical methods such as factor analysis are preferred to determine the colorants' absorption spectra. E. R. Malinowski and D. G. Howery describe a method of factor analysis in "Factor Analysis in Chemistry", John Wiley & Sons, N.Y., 1980, ch. 3, the disclosure of which is incorporated herein by reference. Application of factor analysis to modeling media involves a principal component analysis applied to absorption spectra from a set of media color samples followed by a rotation of the principal directions. The principal component analysis results in directions defining a lower-dimensional space completely describing the sample data variance. Rotation of the principal components attempts to distribute the variance equally among the components, often resulting in factors with physical significance, such as individual colorant absorption spectra.

Preferably, factor analysis is applied to absorption spectra from color negative samples that span the gamut of a film recorder. The absorption spectrum $K^i_{mix}(\lambda)$ of the i-th sample is computed from the measured transmission spectrum $T_n(\lambda)$ and may be expressed as:

$$K^i_{mix}(\lambda) = -\ln[T^i_n(\lambda)/T^i_g(\lambda)]$$

Principal component analysis produces one eigenvector for each colorant in the film. Thus, for color negative film, the principal component analysis produces three eigenvectors, one for each of the cyan, magenta, and yellow dyes. These vectors are transformed using a target rotation described in Malinowski. Normalized absorption spectra from step wedges for each channel of the film recorder are used as aim spectra (i.e., the target vectors for the target rotation). Manual adjustment can be used to modify the target absorption spectra. Such adjustment may be used to compensate for the fact that the step-wedge samples are not single-dye exposures. The rotated vectors preferably are capable of reproducing substantially the entire absorption data set. In order to improve this reproduction, the vectors may require negative concentrations (often with magnitudes of 5% or less of the maximum concentration). The rotated spectra may also include negative absorption regions to reproduce the training set of samples. By constraining the film model's concentrations, the bipolar nature of the concentration is not problematic.

Receiving the estimated spectrum from the media model, the computer system converts the estimated spectrum to estimated digital values using a forward model of the scanner (step 415). The computer system supplies the estimated spectrum to the forward model and the forward model predicts digital values the scanner would produce for the supplied spectrum in the device-dependent coordinate space of the scanner. The forward model includes filter functions and channel-independent tone reproduction curves ("TRCs") which are specific to the scanner. The forward model optionally includes correction functions to represent channel interaction unaccounted for in other sections of the forward model. The forward model is described in more detail below.

The computer system calculates an error value between the target digital values and the estimated digital values (step 420). The computer system preferably calculates the Euclidean distance between the two sets of digital values. The error value can be a composite error value, including the digital values for all the channels, or an error value particular to each digital value. Alternatively, the calculation of the error value may vary for each digital value. If a specified stopping criterion has been met, the estimated spectrum which produced the current estimated digital values is output as the predicted spectrum (step 425). The stopping criterion can be an error tolerance. In one alternative implementation, each digital value has a different tolerance. In such an implementation, the estimated spectrum is the predicted spectrum when each of the errors is less than the corresponding tolerance. If the stopping criterion has not been met, the computer system "searches" the colorant space of the media model by updating the current media coordinates based on the error to determine new media coordinates (step 430). The search engine preferably maintains statistics of the estimated media coordinates and errors to determine an "error surface" model. The search engine uses the accumulated error surface model and the current error to determine new estimated media coordinates. The search engine preferably uses a numerical minimization technique such as Powell's method or BFGS described by W. H. Press et al. in "Numerical Recipes in C", 2 d ed., Cambridge University Press, 1992. This technique is further constrained so that only media coordinates within bounds corresponding to the media model are identified. Thus, the media model restricts the search process, reducing metamerism. The computer system passes the new media coordinates through the media model (step 410) and repeats these steps until the stopping criterion has been met.

Figure 5A:
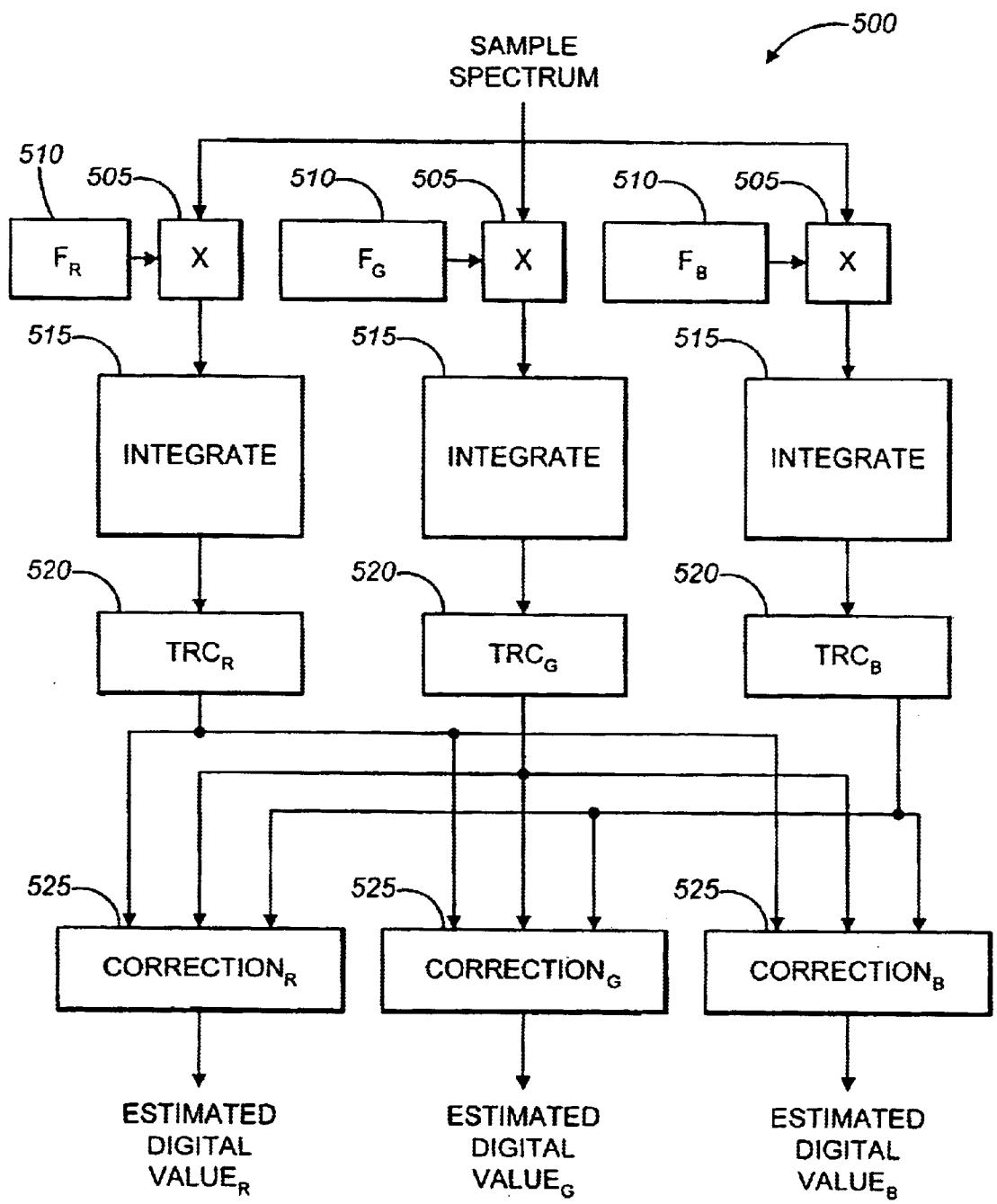
FIG. 5A is a flow chart of a forward scanner model.

As shown in FIG. 5A, in a forward model 500, the computer system receives a sample spectrum, such as the estimated spectrum supplied by the inverse model. The sample spectrum is multiplied 505 by filter functions 510 corresponding to each channel of the scanner. In an implementation where the scanner has red, green, and blue channels, the forward model includes three filter functions, as shown in FIG. 5A. Each filter function 510 represents the product of a filter transmittance spectrum and an illuminant spectrum. The filter transmittance and illuminant spectra need not be separately determined. Alternatively, the illuminant spectrum can be provided or measured directly, as described below. The filter functions 510 are estimated from training samples, as described below. The products of each filter function and the sample spectrum are integrated 515 over at least one wavelength, such as the visible wavelengths, preferably approximately 380 to 730 nanometers. The integrator outputs thus may be expressed as:

$$r = \int S(\lambda) R(\lambda) I(\lambda) d\lambda$$

$$g = \int S(\lambda) G(\lambda) I(\lambda) d\lambda$$

$$b = \int S(\lambda) B(\lambda) I(\lambda) d\lambda$$

where r, g, and b are the integrator outputs; S is the sample spectrum; R, G, and B are the filter transmittance spectra; I is the illuminant spectrum; and $\lambda$ represents wavelength. As noted above, R, G, B, and I may be expressed as filter functions:

$$F_R(\lambda) = R(\lambda) I(\lambda)$$

$$F_G(\lambda) = G(\lambda) I(\lambda)$$

$$F_B(\lambda) = B(\lambda) I(\lambda)$$

The forward model 500 converts the integrator outputs to digital values using tone reproduction curves ("TRC") 520. The TRCs 520 are one-dimensional transformation functions, such as gain-offset gamma functions, and may be expressed as:

$$d_r = T_R[r] = [k_{gain.r} \cdot r + k_{offset.r}]^{\gamma r}$$

$$d_g = T_G[g] = [k_{gain.g} \cdot g + k_{offset.g}]^{\gamma g}$$

$$d_b = T_B[b] = [k_{gain.b} \cdot b + k_{offset.b}]^{\gamma b}$$

The forward model 500 may optionally adjust these digital values from the TRCs 520 using correction functions 525, as described below.

Figure 5B:
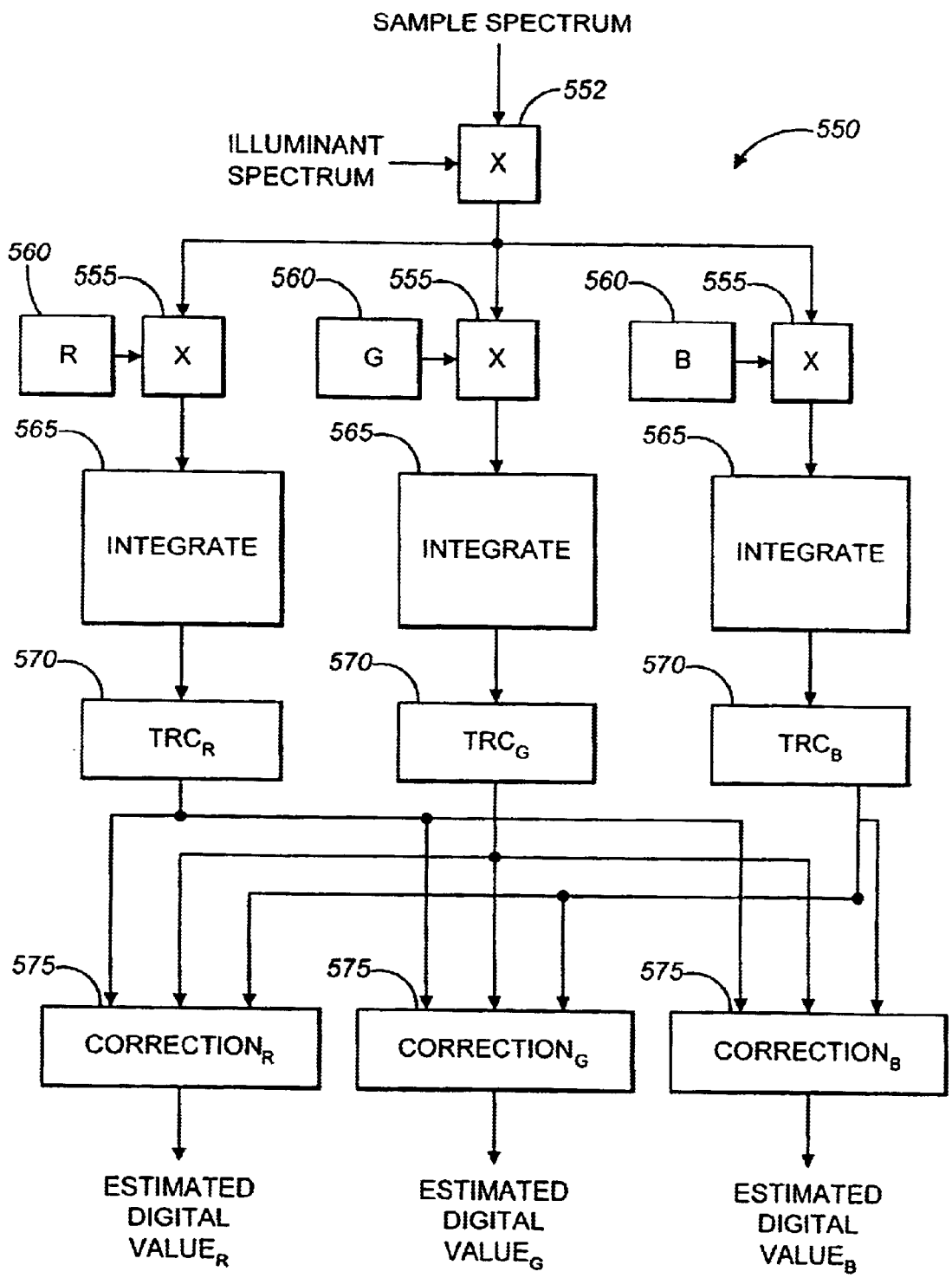
FIG. 5B is a flow chart of an alternative implementation of a forward scanner model.

FIG. 5B shows an implementation of a forward model 550 where the illuminant spectrum is known or measured directly. The operation of the forward model 550 is generally similar to that of the forward model 500 shown in FIG. 5A and described above. The received sample spectrum is multiplied 552 by the supplied illuminant spectrum. This product is multiplied 555 by filter transmittance spectra 560 corresponding to each channel of the scanner. In an implementation where the scanner has red, green, and blue channels, the forward model includes three filter transmittance spectra, as shown in FIG. 5B. The filter transmittance spectra 560 are estimated from training samples using the known illuminant spectrum. Thus, rather than estimating filter functions which represent the products of filter transmittance spectra and an illuminant spectrum as in the forward model 500 of FIG. 5A, the filter transmittance spectra 560 are estimated directly. As above, the resulting products are integrated 565 over the visible wavelengths, preferably approximately 380 to 730 nanometers, and the integrator outputs are converted to digital values TRCs 570. The forward model 550 may optionally adjust these digital values from the TRCs 570 using correction functions 575, as described below.

Figure 6:
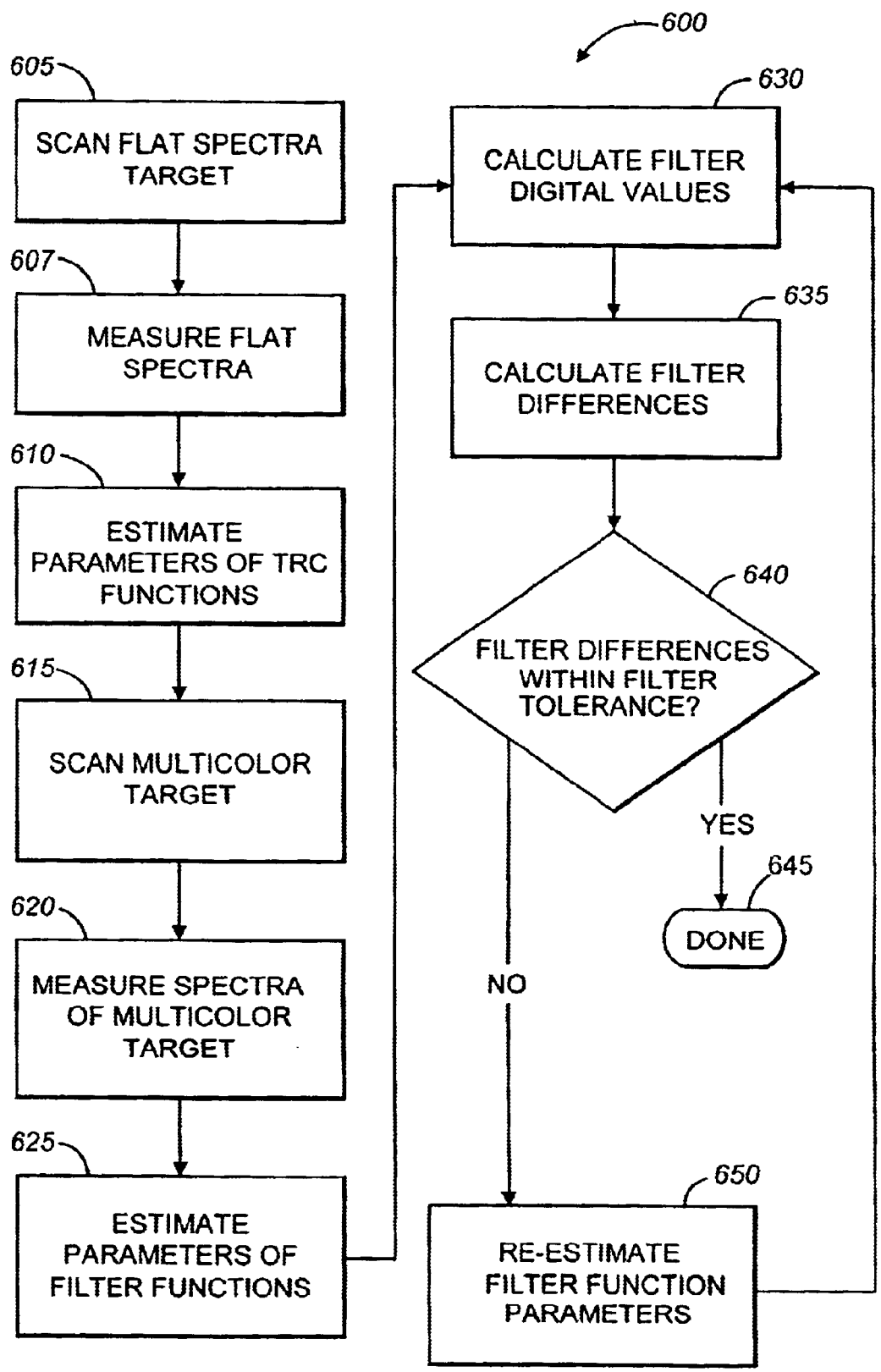
FIG. 6 is a flow chart of estimating parameters for the inverse model.

Before the computer system uses the inverse model to predict the spectral reflectance of the photographic negative, the computer system estimates the parameters of functions within the forward model. As shown in FIG. 6, in a process 600 of estimating parameters, a target having a neutral step wedge is scanned to produce flat sample values (step 605). The neutral step wedge target preferably has reflectance spectra which are substantially flat and a density range which encompasses the density range of most imagery to be digitized by the scanner. The spectra of the target are also measured with a spectrophotometer to produce flat sample spectra (step 607). The spectrophotometer is either reflective or transmissive depending upon the nature of the media.

Figure 7:
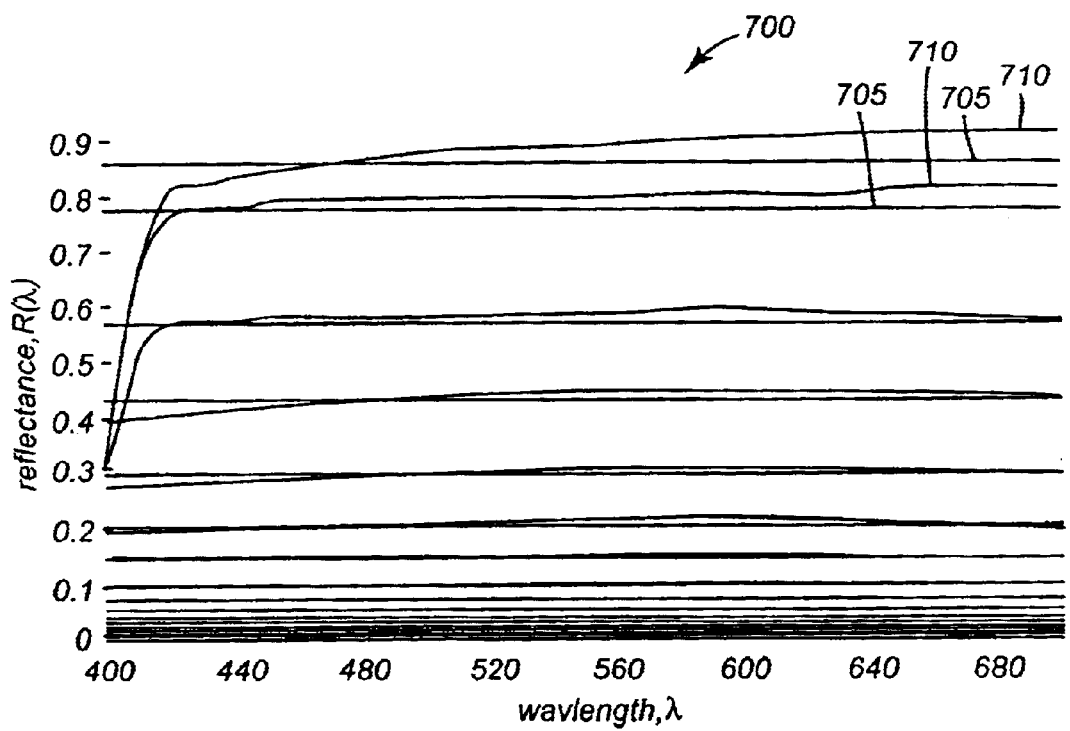
FIG. 7 is a graph of the spectral reflectance of a target with a neutral color wedge.

An example of reflectance spectra 700 from a preferred flat spectra target is shown in FIG. 7. The flat lines 705 are average spectral values for the measured values 710 for each patch over the visible wavelengths (approximately 400 to 700 nm).

For the i-th sample in the flat spectra target, the corresponding measured reflectance spectrum $S_i$ is approximated by a constant, $c_i$, computed by averaging the reflectance spectrum $S_i$ over the visible wavelengths. Accordingly, the integrals described above can be rewritten as (taking r as an example):

$$r_i = c_i \int F_R(\lambda) d\lambda$$

The integral in this equation is also a constant, $\Phi$, independent of the sample spectrum $S_i$.

Therefore the TRC for r can be rewritten as:

$$d_r^i = T_R[r_i] = T_R[c_i\Phi] = [k_{gain.r} c_i \Phi + k_{offset.r}]^{\gamma r}$$

By defining a new gain parameter $k'_{gain.r} = k_{gain.r}\Phi$, then $$d_r^i = T'_R[c_i] = [k'_{gain.r} c_i + k_{offset.r}]^{\gamma r}$$

Because $S_i$ is substantially flat, this equation does not depend on wavelength and so the TRC function can be sampled at the constant $c_i$. The resulting samples preferably are used to estimate the parameters of the one-dimensional transformation functions with a constrained minimization technique using the flat sample values (step 610). This estimation can be an iterative process which repeats until a specified criterion has been met. When a one-dimensional transformation function is a gain-offset-gamma function, the parameters are gain, offset, and gamma. The gain parameter may be too high by a factor of $\Phi$, but this discrepancy may be compensated for by an implicit scale factor introduced when estimating filter function parameters. The TRC parameters are preferably estimated on a channel-independent basis.

To estimate the filter parameters of the filter functions, a second multicolor target including color samples that span the gamut of a particular printing device is scanned to produce multicolor sample values (step 615). Reflectance spectra of the multicolor target are also measured to produce multicolor sample spectra (step 620). The filter functions are preferably approximated in the forward model by Gaussian functions with three parameters: mean, standard deviation, and amplitude. Alternatively, other functions may be used, such as cubic splines, blobs, summed Gaussians, delta functions, or a combination thereof. For example, for a fluorescent illuminant, a combination of delta and Gaussian functions is preferred. An eight-step sampling of RGB color space (a total of 512 samples) may produce sufficient accuracy. Alternatively, fewer samples may be used. Given the estimated TRCs, as described above, a constrained minimization technique is preferably used to estimate the filter parameters (step 625). The estimated filter parameters minimize the average color difference between values produced by scanning the multicolor target and values predicted using the estimated filter functions and the measured spectra of the multicolor target. The computer system calculates filter digital values based on the measured spectra of the multicolor target using the forward model and the estimated TRC and filter functions (step 630). In this estimation, the correction functions preferably are not used. The system calculates a filter difference by comparing the filter digital values to the multicolor sample values from scanning the multicolor target (step 635). The filter difference is an average color difference, preferably calculated by finding the average Euclidean distance between paired values. If a filter stopping criterion is met, such as when the filter difference is within a specified filter tolerance (step 640), estimating the filter parameters is complete (step 645). If not, such as when the filter difference is outside the filter tolerance (step 640), the computer system re-estimates the filter functions (step 650) and repeats the above steps 630. to 640. As with the TRCs, the filter parameters are preferably estimated on a channel-independent basis.

Figure 8A:
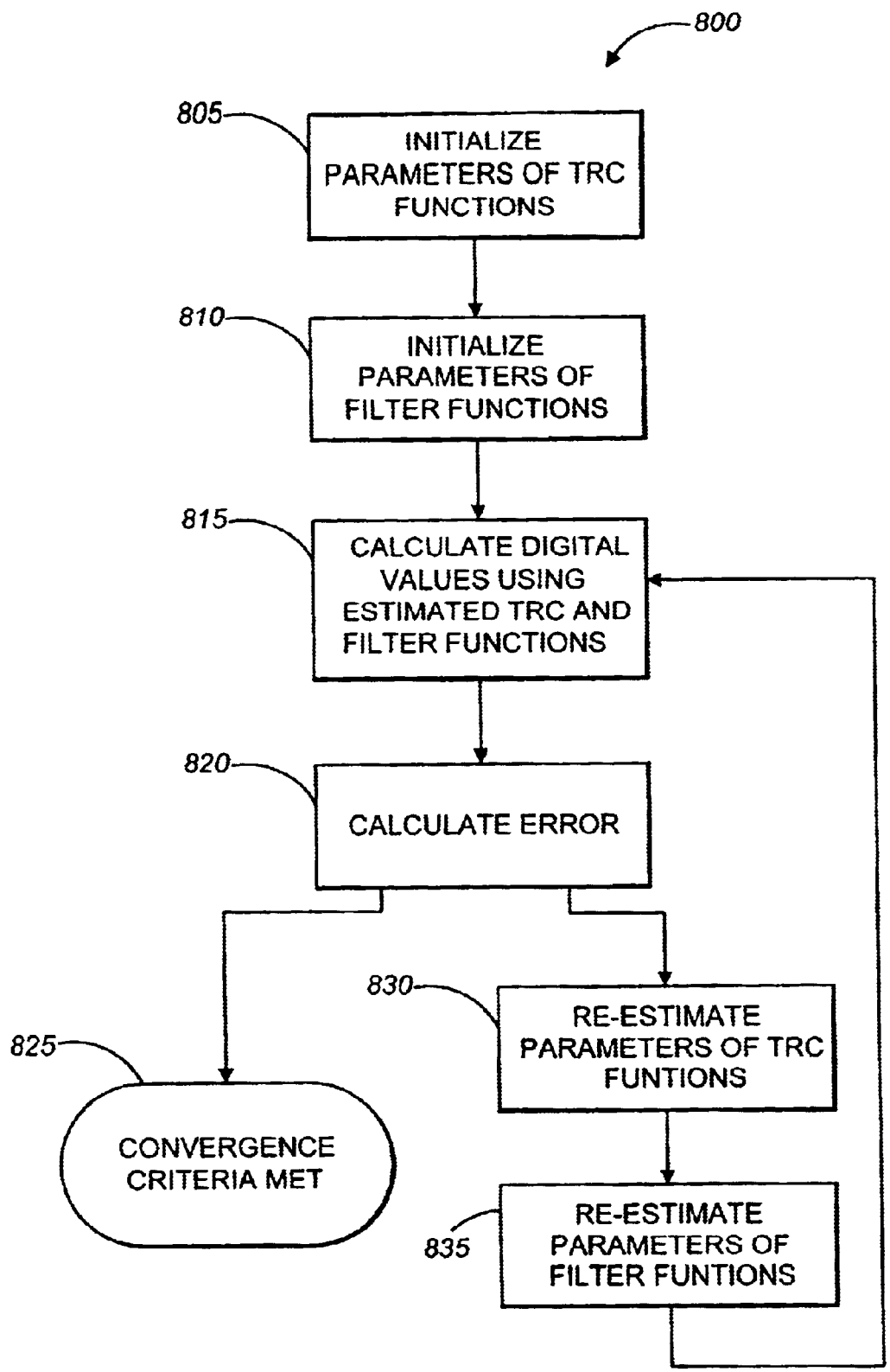
FIG. 8A is a flow chart of estimating parameters for the inverse model.

In an alternative implementation, the TRC and filter function parameters are estimated repeatedly in a construction process until a convergence criterion is met. This convergence criterion can be met when a construction difference is within a construction tolerance, or, alternatively, after a specified number of iterations. As shown in FIG. 8A, in an iterative parameter estimation process 800, the TRC parameters are estimated as described above (step 805). The TRC functions can alternatively be initialized as linear functions. Filter parameters are estimated as described above, including scanning and measuring spectra of a multicolor target (step 810). The filter functions can alternatively be initialized as conventional R, G, and B filter functions, such as wide band Gaussians centered at 450, 550, and 650 nanometers. The computer system estimates construction digital values with the forward model using the estimated TRC functions and filter functions based on measured spectra of a multicolor target, such as the multicolor target (step 815). A construction difference between these construction digital values and the digital values from scanning the multicolor target is calculated (step 820). If the convergence criterion has been met, such as when the construction difference is within the construction tolerance, the computer system is ready to model the scanner with an actual sample (step 825). If not, such as when the construction difference is outside the construction tolerance, the computer system re-estimates the TRC and filter parameters. The estimated filter parameters are used to re-estimate the TRC parameters (step 830). The filter functions are also re-estimated using the re-estimated TRC functions, as described above (step 835). The re-estimated TRC and filter functions are used to calculate new construction digital values (step 815). The process repeats until the construction difference is within the construction tolerance. Alternatively, the computer system also uses correction equations, such as stepwise multiple linear regression functions, to further refine the forward model predictions.

Figure 8B:
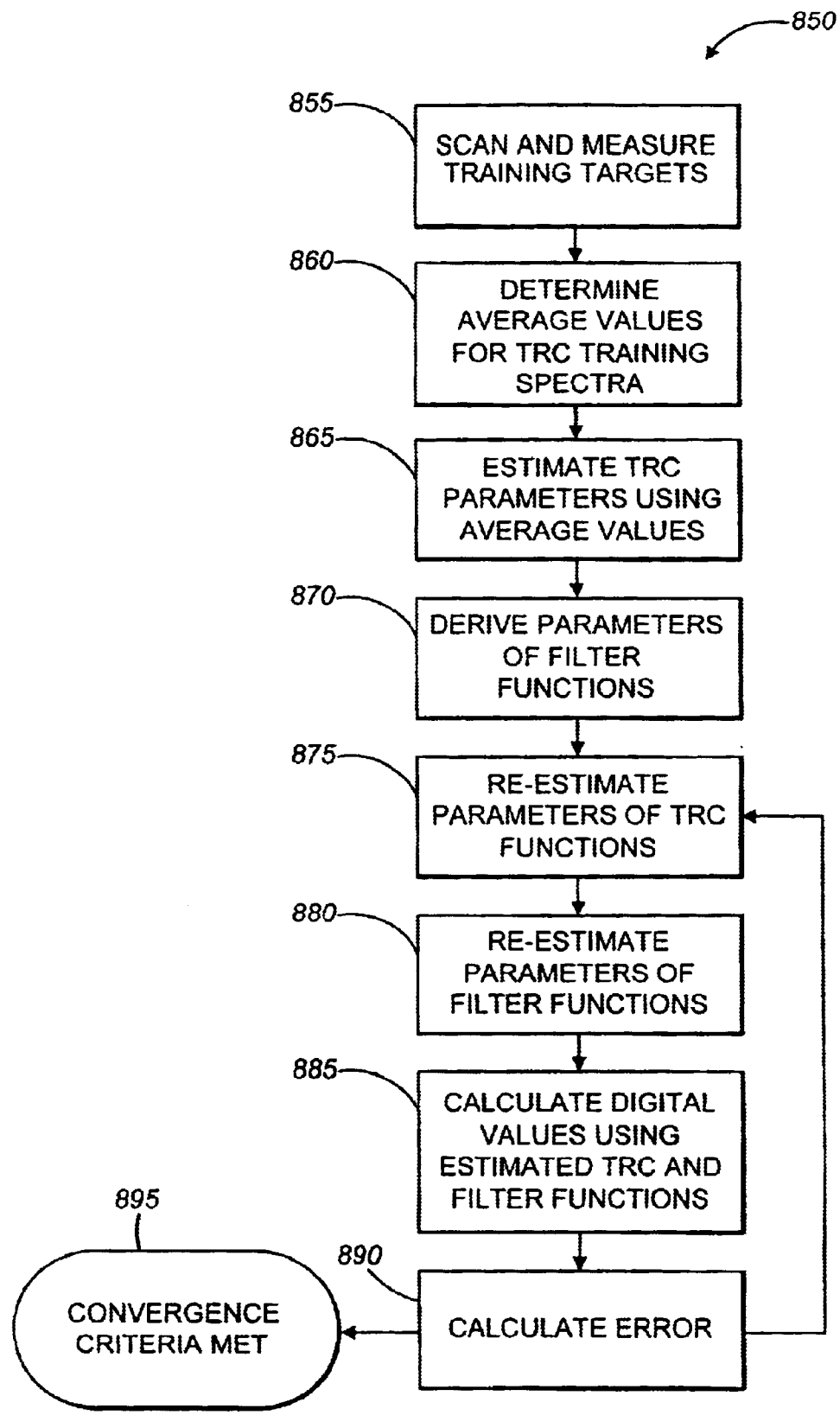
FIG. 8B is a flow chart of estimating parameters for the inverse model.

In another alternative implementation where the TRC and filter function parameters are estimated repeatedly in a construction process until a convergence criterion is met, the TRC parameters and filter parameters are derived from training targets measured with a spectrophotometer. The convergence criterion can be met when a construction difference is within a construction tolerance, or, alternatively, after a specified number of iterations. As shown in FIG. 8B, in an iterative parameter estimation process 850, TRC and filter function training targets, such as the flat and multicolor targets described above, are scanned and measured with a spectrophotometer (step 855). The computer system determines average (constant) values for the TRC training spectra (step 860). The computer system estimates the TRC parameters using the constant values for the TRC training spectra (step 865). The computer system preferably estimates the TRC parameters using a constrained minimization technique. The computer system derives the filter parameters using the measured training samples and constrained minimization (step 870). The computer system replaces the constant TRC training spectra with the actual spectral measurements and re-estimates the TRC parameters (step 875). The computer system uses the re-estimated TRC parameters to re-estimate the filter parameters (step 880). The computer system estimates construction digital values with the forward model using the estimated TRC functions and filter functions based on the measured spectra of the multicolor target (step 885). A difference between these construction digital values and the digital values from scanning the target is calculated (step 890). If the convergence criterion has been met, such as when the construction difference is within the construction tolerance, the computer system is ready to model the scanner with an actual sample (step 895). If not, such as when the construction difference is outside the construction tolerance, the computer system re-estimates the TRC and filter parameters in steps 875 and 880, and the process repeats until the construction difference is within the construction tolerance. Alternatively, the computer system also uses correction equations, such as stepwise multiple linear regression functions, to further refine the forward model predictions.

Optional correction functions (shown as functions 525 in FIG. 5A) are preferably used to refine the estimation of the forward model. While the actual physical process is not clearly understood, there may be channel interaction which the filter functions 510 and TRCs 520 do not reflect. The correction functions 525 represent this postulated channel interaction. The correction functions are preferably multidimensional regression functions. The preferred regression correction functions may be formed as a linear combination of a set of predictor functions which are themselves functions of the TRC output values. Considering the red channel, the regression function may be written as:

$$d'_r = \sum_{i=1}^{N_{pred}} \beta_i f_i(d_r, d_g, d_b) + \beta_0$$

where $d'_r$ is the corrected model output; $d_r$, $d_g$, and $d_b$ are the TRC output values; $f_i(d_r, d_g, d_b)$ is the i-th predictor function; $\beta_i$ is the i-th regression parameter; and $N_{pred}$ is the number of predictor functions in the regression. The specification of the form of the predictor functions is subjective. For example, when modeling RGB scanner output, the predictor functions could be selected to be: $f_1(d_r, d_g, d_b)=d_r$ $f_2(d_r, d_g, d_b)=d_g$ $f_3(d_r, d_g, d_b)=d_b$ $f_4(d_r, d_g, d_b)=d_r^2$ $f_5(d_r, d_g, d_b)=d_r d_g$ $f_6(d_r, d_g, d_b)=d_r d_b$ $f_7(d_r, d_g, d_b)=d_g^2$ $f_8(d_r, d_g, d_b)=d_g d_b$ $f_9(d_r, d_g, d_b)=d_b^2$ Given a specification of the predictor functions, the regression parameters $\{\beta_i\}$ can be determined via a standard stepwise regression process such as that described by S. Weisberg in "Applied Linear Regression" Chapter 8, p190ff, John Wiley and Sons, N.Y. 1980, the disclosure of which is incorporated herein by reference. Stepwise regression with a 95% confidence level can be used with the digital values from the TRCs 520 and their combinations as the regression variables and the scanner RGB values from the scanner as the data to be fit. These correction functions 525 often have a dominant linear term indicating the forward model 500 accounts for most of the behavior of the scanner. Accordingly, each correction function 525 receives all the digital values from the TRCs 520 and generates an estimated digital value for the respective R, G, B channel.

Photographic Printer Model

The photographic printer model is an idealized printing apparatus for determining spectral properties of the exposure illuminant over time. The photographic printer model includes a printing illuminant, filters which may modify the printing illuminant, and an exposure schedule that specifies the durations and filter selections for a sequence of exposure periods. The printer model preferably also includes a color temperature component.

Figure 9:
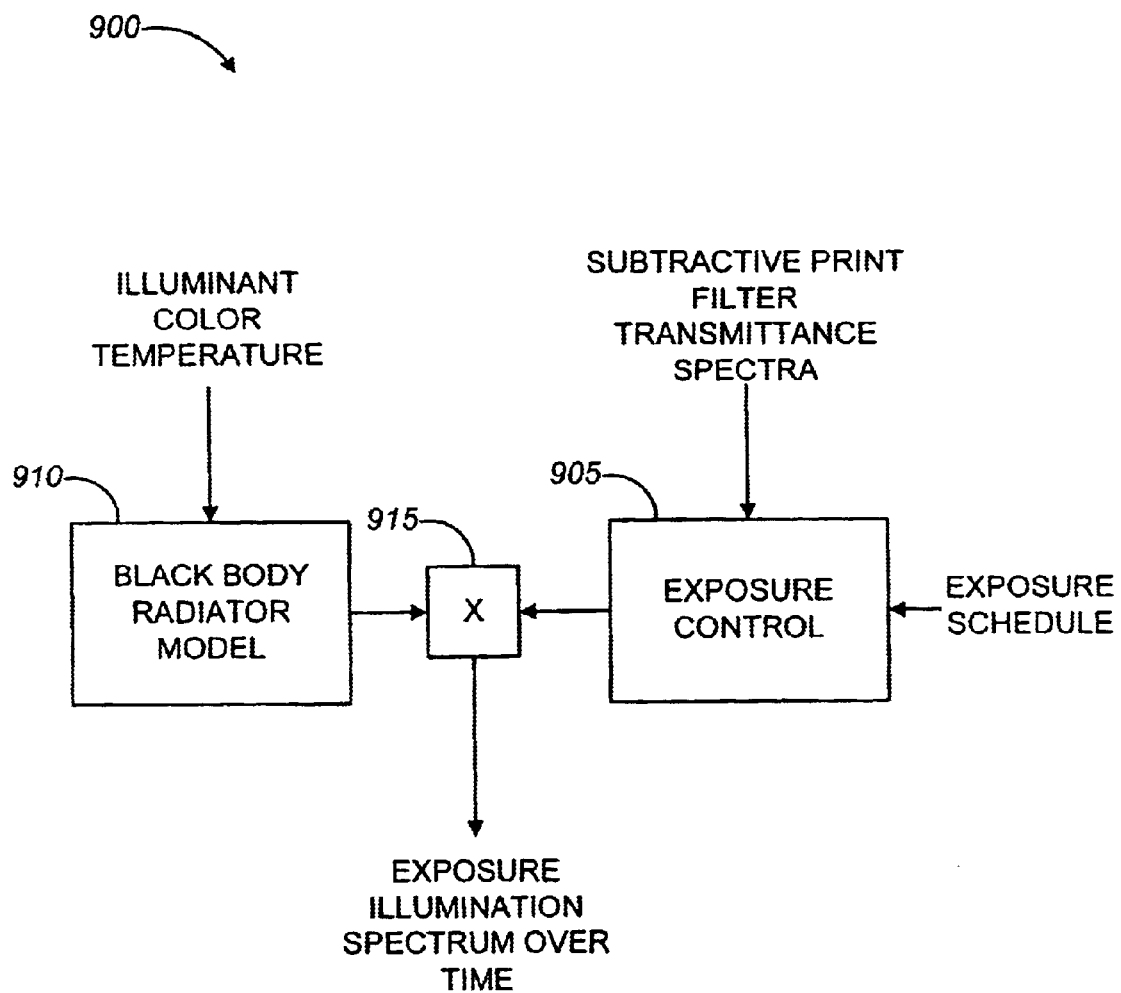
FIG. 9 is a block diagram of a photographic printer model.

As shown in FIG. 9, in the photographic printer model 900, an exposure control 905 receives a user-supplied exposure schedule and subtractive print filter transmittance spectra. The exposure control 905 applies the exposure schedule to the subtractive print filter transmittance spectra to derive print filter transmittance spectra over time. A parametric function 910, preferably a black body radiator model, receives an illuminant color temperature to model the printing illuminant with a print illuminant power spectrum. Alternatively, the printing illuminant may be represented by a measured or user-specified spectrum. The computer system multiplies 915 the print filter transmittance spectrum by the print illuminant power spectrum to calculate the exposure illuminant spectrum over time.

Figure 10:
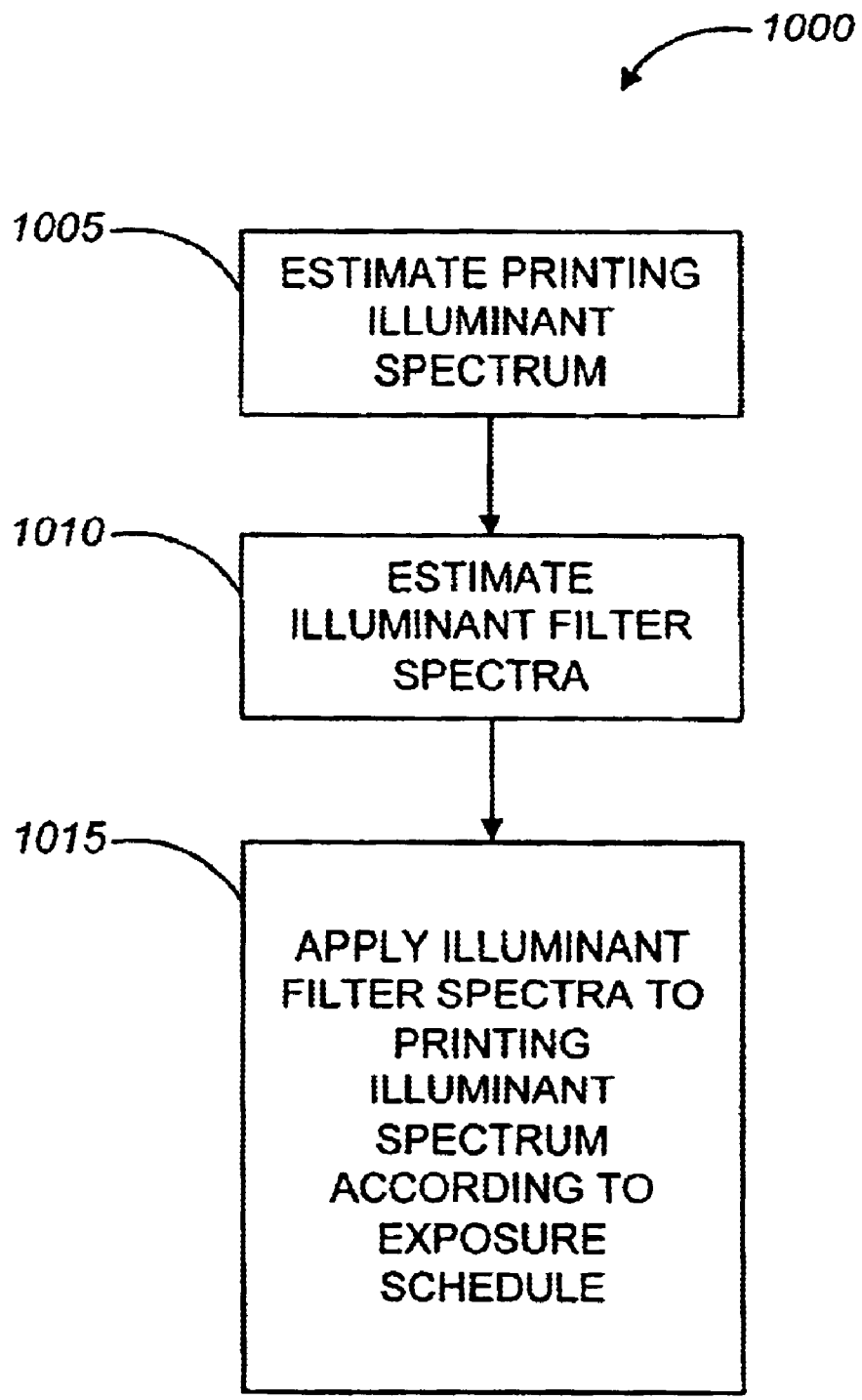
FIG. 10 is a flow chart of the photographic printer model.

As shown in FIG. 10, in a process 1000 of estimating the exposure illuminant spectrum over time, the computer system estimates the printing illuminant spectrum (step 1005). As noted above, the printing illuminant spectrum may be a supplied spectrum or derived using a parametric model. The parametric black-body radiator model may be expressed as:

$$I(\lambda, T) = 3.74183 \times 10^{-16} \lambda^{-5} (\exp[0.014388/\lambda T] - 1)^{-1}$$

where T is the color temperature in °K, $\lambda$ represents wavelength, and I is the resulting illuminant spectrum. I($\lambda$, T) is preferably normalized to make the spectral power at 560 nm equal to 1 or 100. A primary illuminant filter may be applied to the computed power spectrum to reduce the power in certain spectral ranges like the red or near infrared. This filter provides better emulation of real print illuminants while still allowing temperature variation using a single parameter. Commercial photo finishing equipment may have lamp house filters to adjust the printing beam's color temperature to compensate for differences in paper sensitivities. To control the temperature of the printing beam, the color temperature of the black-body radiator may be varied manually or an appropriate measured illuminant spectrum may be used.

The computer system estimates the illuminant filter transmittance spectra (step 1010). The filter transmittance spectra are preferably measured from appropriate physical photographic printer filters. Illuminant filters in subtractive photographic printers may be dichroic filters with flat passbands and stopbands and steep transition bands to remove specific wavelength ranges from the printing illuminant. Additive printers may use red, green, and blue illuminants. The computer system preferably has the capability to emulate additive printing with a subtractive system by using pairwise combinations of cyan, magenta, and yellow filters to obtain the red, green, and blue exposures. Many techniques for modeling the exposure illuminant are possible, including parametric models and direct measurement of both additive and subtractive printing devices, filters, and illuminants. For example additive photographic printers may use red, green, and blue exposure illuminants. The selected technique preferably specifies the spectral content of the exposure illuminant over time. The resulting function is preferably a function of time and wavelength subject to user control.

The computer system applies the illuminant filter transmittance spectra to the printing illuminant spectrum according to the exposure schedule to estimate the exposure illumination spectrum over time (step 1015). Accordingly, the exposure illumination spectrum has spectral properties that vary over time according to the exposure schedule. The exposure schedule specifies the time periods that each print filter would be switched into the primary printing beam during the course of an exposure in the modeled printer. The exposure schedule can specify zero or more filters for any time period. The exposure schedule functions as an interface for the user. The parameters of the exposure schedule are the same as those parameters which would be modified during manual or automatic color correction.

An example 1100 of an exposure schedule is shown in FIG. 11. In this example 1100, a subtractive printer is used in an additive printing mode with red, green, and blue exposure periods. The spectral power of the printing illuminant is constant within each exposure period, and is the product of the printing illuminant times the product of the active filter transmittances for the period.

Photographic Paper Model

The photographic paper model represents the behavior of real photographic media, both in terms of the production of colored dyes through exposure and processing and in the colorimetric properties of the resulting dye-based image. The paper model includes spectral sensitivities of dye layers, preferably CMY dye layers. The paper model also includes parameters such as exposure-dye transfer characteristics, paper base reflectance, and dye absorption spectra of the paper. Each of these is measured directly, estimated, or derived from measurements. The estimation process may be iterative due to interdependence between some of these paper parameters.

Figure 12:
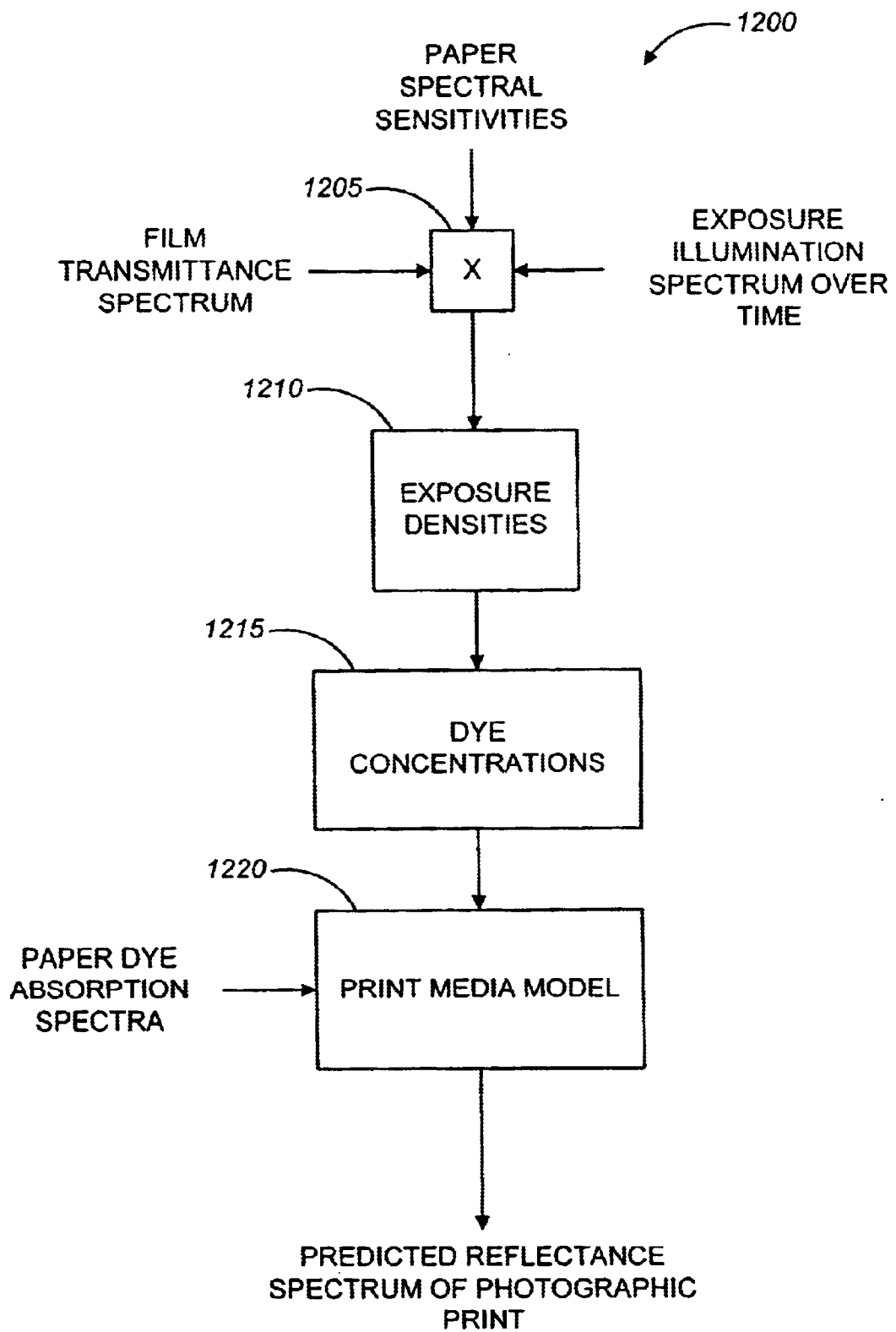
FIG. 12 is a block diagram of a photographic paper model.

As shown in FIG. 12, in the photographic paper model 1200, the computer system multiplies 1205 the film transmittance spectrum from the scanner and film models, the exposure illumination spectrum from the photographic printer model, and paper spectral sensitivities. The computer system converts the spectral product to log integrated exposures 1210. The computer system then converts the log integrated exposures to dye concentrations 1215. The computer system supplies the dye concentrations to a print media model 1220. The print media model 1220 uses the paper reflectance spectrum and the dye absorption spectra to convert the supplied dye concentrations to the predicted reflectance spectrum for the modeled photographic print.

Typical spectral sensitivity curves indicate the energy required to produce a specified density above "fog" on photographic paper at each wavelength in the visible spectrum. Manufacturers of photographic paper may supply these curves for their papers, and these supplied curves may or may not be weighted by the power spectrum of the exposure illuminant. Spectral sensitivity curves which have been normalized by the illuminant spectral power are referred to as "equi-energy sensitivities". Equi-energy sensitivity curves may be used in a manner analogous to color matching functions and indicate the way photographic paper "sees" an illuminated negative image. The model assumes the sensitivities do not vary with the level of exposure and fixed sensitivity curves provide acceptable predictions.

Sensitivity curves based on iso-density contours are generally not desirable for spectral modeling of the media. Densitometers typically do not provide a photographic channel independent measure due to secondary absorptions of the photographic media's dyes. For example, secondary absorption may cause the cyan dye to contribute to the magenta and yellow dyes' sensitivity values. This characteristic reduces the validity of the density-based sensitivity curves. Dye concentration, however, provides a channel independent measure for photographic media. Accordingly, the photographic paper model preferably uses equi-energy sensitivity curves that have been derived from iso-concentration contours. These concentration-based curves describe the energy required at each wavelength to produce a specified dye concentration and are a truer and more desirable representation of the media's actual sensitivities.

The photographic media's dye-exposure transfer characteristics describe the amount of dye produced for a given channel as a function of the log integrated exposure for that channel. The integrated exposure $E_x$ for a channel x may be expressed as:

$$E_x = \iint_{80} T_n(\lambda) e(\lambda,t) S_x(\lambda) d\lambda dt$$

where $T_n(\lambda)$ is the spectral transmittance of a color patch, $e(\lambda,t)$ is the time-varying exposure illuminant, and $S_x(\lambda)$ is the photographic paper sensitivity for channel x. If the spectrum of the exposure illuminant is constant within each of a sequence of exposure periods (e.g., a set specified by an exposure schedule), then the integrated exposure may be written as:

$$E_x = \sum_{i=1}^{N_p} \left[ \int T_n(\lambda) e(\lambda, i) S_x(\lambda) d\lambda \cdot t_{\exp}^i \right]$$

where $N_p$ is the number of exposure periods, and $e(\lambda,i)$ and $t_{\exp}^i$ are the exposure illuminant spectrum and duration for the i-th exposure period, respectively. Log integrated exposure, $H_x$ is the log of the integrated exposure and may be expressed as:

$$H_x = \log_{10} E_x$$

Plots of dye concentration versus log integrated exposure for CMY channels are referred to as "C-logE" curves. C-logE curves preferably do not vary with changing exposure illumination as a direct consequence of the definition of the integrated exposure described above. As a result, the C-logE curves can be used for any exposure condition without re-calculation.

C-logE curves are based on channel independent measures. Because C-logE concentration values vary between zero and each channel's maximum concentration, the concentration values may be normalized to 1.0 by proper adjustment of the dye absorption spectra. The colorant mixing model is also based on dye concentration, as discussed below, and so C-logE curves allow a substantially direct computation of the reflectance of a sample color.

The C-logE characteristics of processed photographic paper depend on development conditions, such as chemistry and temperature of the developer solution and development time. The photographic paper model represents these conditions at a single point in time. Unintentional variations in these conditions mean there may be differences between actual prints and model-based predictions. Intentional variations in development conditions may be modeled by adjusting the C-logE curves, either through replacement with alternative measured values or through parametric adjustments. A. E. Saunders describes such adjustments in "Fitting the Photographic Characteristic Curve: a Functional Equation Approach", Journal of Photographic Science, Vol. 41, 1993, pp. 186–93, the disclosure of which is incorporated herein by reference.

The paper spectral sensitivities and C-logE curves describe the dye production process as a function of exposure. Specifically, the C-logE curves convert log integrated exposures into concentration values. For a channel x, the C-logE function can be expressed as:

$$conc_x = C_x(H_x)$$

where $C_x$ is the C-logE function represented in, for example, parametric or tabular form, $H_x$ is the log integrated exposure as described above, and $conc_x$ is the resulting dye concentration.

Photographic materials such as paper and film can exhibit a behavior known as reciprocity failure. Reciprocity failure is a breakdown of the equal tradeoff between time and the intensity of the exposure illuminant. This reciprocity can be seen in the calculation of the integrated exposure $E_x$, described above. For very small values of exposure time or illuminant intensity, this tradeoff does not always hold exactly. This reciprocity failure can be modeled by adjusting the inputs and/or outputs of the C-logE calculation. Such modifications could be functions of log integrated exposure and exposure time. The functions could be implemented as parametric equations or lookup tables. For example, the C-logE function for a channel x could be modified to include such adjustments as:

$$conc_x = C_x[H_{rec,x}(H_x, t_x, \theta_x)]$$

where $t_x$ is the exposure time and $H_{rec,x}$ is a reciprocity failure adjustment function with O, as its parameter vector (or lookup table).

The colorimetric properties of the dye amounts resulting from the C-logE calculations are preferably modeled with a Kubelka-Munk colorant mixing model and a Saunderson correction for surface refractive index differences. These calorimetric properties represent the predicted reflectance spectrum of the modeled photographic print and may be expressed as:

$$R'_p(\lambda) = \frac{(1-k_1)(1-k_2)R_p(\lambda)}{1-k_2 R_p(\lambda)}$$

with $$R_p(\lambda) = R_g(\lambda) \exp[-2\{cK_C(\lambda) + mK_M(\lambda) + yK_y(\lambda)\}]$$

where $\lambda$ represents wavelength, c, m, and y are the dye concentrations as determined by the C-logE curves, e.g., $m = C_M(H_M)$. $K_C(\lambda)$, $K_M(\lambda)$, and $K_y(\lambda)$ are the photographic paper's normalized spectral dye absorptivities, determined by factor analysis similar to that for the film dyes described above in the scanner and film models. $R_g(\lambda)$ is the reflectance of the paper base, and $R_p(\lambda)$ and $R_p'(\lambda)$ are the uncorrected and corrected spectral reflectances of a color patch, respectively. Values used in the Saunderson correction are on the order of $k_1 = 0.04$ and $k_2 = 0.6$, depending upon the medium. Accordingly, $R_p'(\lambda)$ is the predicted reflectance spectrum of the modeled photographic print.

Accordingly, the paper model performs the final calculation of the predicted reflectance spectrum. However, as noted above, the calculation could be performed in an alternate structure in a different implementation. For example, in an alternative implementation, the print model controls the overall execution and determination of the final predicted reflectance spectrum. The print model makes requests for calculations from the paper model, such as requesting the log integrated exposures be converted to concentrations and then requesting reflectance spectra for given concentrations.

In one implementation, the photographic paper's dye absorption curves are determined in a manner similar to that of the film. Wedges which approximate steps in each of the paper's colorant channels are printed and the resulting prints and the paper base are measured with a spectrophotometer. The measured reflectance spectra are converted to absorption spectra using the equations for the calorimetric properties described in the photographic paper model. As with color negative film, producing single dye prints for determination of each dye's absorption spectrum is difficult. Hence, factor analysis with target rotation is applied to these absorption spectra to produce the desired absorption curves. Eigenvalues of the absorption spectra of the step wedge for each colorant can be used as aim spectra in the target rotation, as noted above. In one implementation, to determine C-logE curves, a transmissive neutral step wedge is printed using the photographic printing process being modeled. A neutral step wedge has essentially gray samples in discrete steps from low density to high density. The reflectance spectra of the printed step wedge samples are measured, as are the transmission spectra of the neutral step wedge samples. Log integrated exposures for each transmissive wedge sample are found as described above. The paper's dye absorptivities are found and the dye concentrations are found for each printed sample using a colorant formulation process, such as that described by R. S. Berns in "Spectral modeling of a dye diffusion thermal transfer printer", Journal of Electronic Imaging, Vol. 2, No. 4, October 1993, pp. 359–70, the disclosure of which is incorporated herein by reference. For each colorant, the paired concentration and log integrated exposure values are input into a spline fitting function. The resulting splines are resampled with a uniform spacing.

In one implementation, to derive the spectral sensitivities of the photographic paper, experimentally determined curves or estimates are used to initialize parameters of a search process for the best-fit sensitivities as described above. Because the C-logE curves depend on the spectral sensitivities for computation of log integrated exposure, the C-logE curves are updated as the sensitivities change. An iterative process of adjusting the sensitivities and then the C-logE curves is performed until a stopping criterion is met, such as when the curves sufficiently converge.

Implementation

The invention may be implemented in hardware or software, or a combination of both. However the invention preferably is implemented in computer programs executing on programmable computers each comprising a processor a data storage system (including volatile and nonvolatile memory and/or storage elements), at least one input device, and at least one output device. Program code is applied to input data to perform the functions described herein and generate output information. The output information is applied to one or more output devices, in known fashion.

Each such program may be implemented in any desired computer language (including machine, assembly, high level procedural, or object oriented programming languages) to communicate with a computer system. In any case, the language may be a compiled or interpreted language.

Each such computer program is preferably stored on a storage media or device (e.g., ROM, CDROM, or magnetic media) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

A number of implementations of the present invention have been described. Nevertheless, it will be understood that various modifications may be made without departing from the spirit and scope of the invention. Additional variations are possible, such as using CMY color space coordinates for the forward model instead of RGB color space coordinates. Alternatively, the models for the components (e.g., the negative, the dyes, the paper, etc.) can be selected from a database of available models. The filter functions can also be provided or measured directly. Accordingly, it is to be understood that the invention is not to be limited by the specific illustrated embodiments, but only by the scope of the appended claims.

What is claimed is:

1. A method of modeling spectral characteristics of a photographic print based on a photographic negative, comprising:
   converting digital values from scanning a photographic negative to a film transmittance spectrum using a photographic negative film model corresponding to a media of the photographic negative;
   estimating an exposure illumination spectrum over time using an exposure schedule;
   estimating paper spectral sensitivities of a photographic paper corresponding to the photographic print;
   integrating over time spectral products of the film transmittance spectrum, the exposure illumination spectrum, and the paper spectral sensitivities;
   converting the integrated spectral products into log integrated exposures;
   converting the log integrated exposures to dye concentrations; and
   converting the dye concentrations to a predicted reflectance spectrum.

2. The method of claim 1, where estimating the exposure illumination spectrum further comprises using a color temperature.

3. The method of claim 1, where the photographic negative is a color negative.

4. The method of claim 1, where the photographic negative is a black and white negative.

5. The method of claim 1, where converting digital values to a film transmittance spectrum comprises:
   iteratively updating media coordinates corresponding to an estimated spectrum until a stopping criterion is met, where the media coordinates are in a colorant space of a sample scanned by an image acquisition device; and
   constraining said updating using a media model corresponding to the sample with a constrained minimization process.

6. The method of claim 1, where converting digital values to a film transmittance spectrum comprises:
   (a) estimating media coordinates in a colorant space of the photographic negative scanned by an image acquisition device, where the estimated media coordinates correspond to target digital values produced by the image acquisition device when scanning the photographic negative;
   (b) converting the estimated media coordinates to an estimated spectrum using a photographic negative film model corresponding to the photographic negative;
   (c) estimating digital values by supplying the estimated spectrum to a forward model which models the image acquisition device;
   (d) identifying a film error between the estimated digital values and the target digital values; and
   (e) if a stopping criterion has not been met, searching the colorant space for media coordinates according to the film error and repeating steps (b) through (e) until the stopping criterion has been met.

7. The method of claim 6, where the image acquisition device is a scanner.

8. The method of claim 6, where the stopping criterion is met if the error is within a tolerance.

9. The method of claim 6, where:
   the media coordinates for the photographic negative film model represent dye concentrations of cyan, magenta, and yellow dyes; and
   the media coordinates which produce the film error within the film tolerance form the film transmittance spectrum.

10. The method of claim 6, where identifying the film error comprises calculating a Euclidian distance between the estimated digital values and the target digital values.

11. The method of claim 6, where said searching the colorant space includes updating the media coordinates according to the error.

12. The method of claim 6, where said searching the colorant space includes using a numerical minimization technique constrained so as not to identify media coordinates outside bounds corresponding to the photographic negative.

13. The method of claim 6, where the image acquisition device has at least one output channel, and the forward model comprises, for each output channel of the image acquisition device:
   multiplying a sample spectrum supplied to the forward model and a value of a filter function to produce a spectral product, where the value of the filter function represents a product of a filter transmittance spectrum corresponding to a filter of the image acquisition device and an illuminant spectrum corresponding to an illuminant;
   integrating the spectral product over at least one wavelength to produce an integral value; and
   converting the integral value into an estimated digital value by applying a one-dimensional transformation function to the integral value.

14. The method of claim 13, where the spectral product is integrated over the visible wavelengths.

15. The method of claim 13, further comprising:
applying a multidimensional regression function to the estimated digital values to model channel interaction in the image acquisition device.

16. The method of claim 13, where the one-dimensional transformation function is a gain-offset-gamma function.

17. The method of claim 16, further comprising estimating parameters of the gain-offset-gamma function, where such estimation comprises:
scanning a flat spectra target to produce flat sample values, where the flat spectra target includes a neutral color wedge such that spectra are substantially constant at each visible wavelength;
measuring flat sample spectra of the flat spectra target; and
estimating gain, offset, and gamma parameters based upon the flat sample values and the flat sample spectra using a constrained minimization technique.

18. The method of claim 13, further comprising estimating filter parameters of the filter function, where such estimation comprises:
scanning a multicolor target to produce multicolor sample values, where the multicolor target includes colors spanning a gamut of a printing device which produced the multicolor target;
measuring multicolor sample spectra of the multicolor target;
estimating filter parameters of the filter function based on the multicolor sample values and the multicolor sample spectra using a constrained minimization technique;
calculating filter digital values by supplying the multicolor sample spectra to the forward model and using the estimated filter functions;
calculating a filter difference by comparing the filter digital values to the multicolor sample values; and
if a filter stopping criterion has not been met, re-estimating the filter parameters based on the filter difference and repeating the steps of calculating filter digital values, calculating the filter difference, and re-estimating the filter parameters until the filter stopping criterion has been met.

19. The method of claim 18, where the filter stopping criterion is met if the filter difference is within a filter tolerance.

20. The method of claim 18, where:
the filter functions are Gaussian functions; and
the filter parameters include mean, standard deviation, and amplitude.

21. The method of claim 18, where the one-dimensional transformation function is a gain-offset-gamma function, and the method further comprises:
estimating gain-offset-gamma parameters for the gain-offset-gamma function;
calculating construction digital values using the gain-offset-gamma function and filter function with the respective estimated parameters;
calculating a construction difference based on the construction digital values and the multicolor sample values; and
if a convergence criterion has not been met, re-estimating the gain-offset-gamma parameters and the filter parameters until the convergence criterion is met.

22. The method of claim 21, where the convergence criterion is met if the construction difference is within a construction tolerance.

23. The method of claim 21, where estimating gain-offset-gamma parameters comprises:
scanning a flat spectra target to produce flat sample values, where the flat spectra target includes a neutral color wedge such that spectra are substantially constant at each visible wavelength;
measuring flat sample spectra of the flat spectra target; and
estimating gain, offset, and gamma parameters based upon the flat sample values and the flat sample spectra using a constrained minimization technique.

24. The method of claim 13, where the one-dimensional transformation function is a gain-offset-gamma function, and the method further comprises:
scanning a flat spectra target to produce flat sample values, where the flat spectra target includes a neutral color wedge such that spectra are substantially constant at each visible wavelength;
measuring flat sample spectra of the flat spectra target;
scanning a multicolor target to produce multicolor sample values, where the multicolor target includes colors spanning a gamut of a printing device which produced the multicolor target;
measuring multicolor sample spectra of the multicolor target;
determining flat average values based on the flat sample values;
estimating gain-offset-gamma parameters for the gain-offset-gamma function based on the flat average values and the flat sample spectra using constrained minimization;
estimating filter parameters for the filter functions based on the multicolor sample values and the multicolor sample spectra using constrained minimization;
re-estimating the gain-offset-gamma parameters using the flat sample spectra;
re-estimating the filter parameters using the re-estimated gain-offset-gamma functions;
calculating construction digital values using the gain-offset-gamma function and filter function with the respective re-estimated parameters based on the multicolor sample spectra;
calculating a construction difference based on the construction digital values and the multicolor sample values; and
if a convergence criterion has not been met, re-estimating the gain-offset-gamma parameters and the filter parameters until the convergence criterion is met.

25. The method of claim 13, where the image acquisition device has at least one output channel, and the forward model comprises, for each output channel of the image acquisition device:
multiplying a sample spectrum supplied to the forward model and an illuminant spectrum corresponding to an illuminant to produce a first spectral product;
multiplying the first spectral product by a filter transmittance spectrum corresponding to a filter of the image acquisition device to produce a second spectral product;
integrating the second spectral product over at least one wavelength to produce an integral value; and converting the integral value into an estimated digital value by applying a one-dimensional transformation function to the integral value.

26. The method of claim 25, further comprising applying a multidimensional regression function to the estimated digital values.

27. The method of claim 25, where the one-dimensional transformation function is a gain-offset-gamma function.

28. The method of claim 1, where estimating an exposure illumination spectrum comprises:
   estimating a printing illuminant spectrum;
   estimating illuminant filter transmittance spectra which modify the printing illuminant;
   applying the estimated illuminant filter transmittance spectra to the printing illuminant spectrum according to an exposure schedule, where the exposure schedule specifies durations and filter selections for at least one exposure period.

29. The method of claim 28, where the exposure schedule specifies at least one time period where at least one illuminant filter is exposed to the printing illuminant.

30. The method of claim 28, where the printing illuminant spectrum is a measured spectrum of an illuminant.

31. The method of claim 28, where the printing illuminant spectrum is derived from a parametric model.

32. The method of claim 28, where the printing illuminant spectrum is derived from a black-body radiator model.

33. The method of claim 28, where the illuminant filter transmittance spectra model filters of a subtractive photographic printing device.

34. The method of claim 28, where the illuminant filter transmittance spectra model filters of an additive photographic printing device.

35. The method of claim 1, where the paper spectral sensitivities are equi-energy sensitivity curves derived from iso-concentrations contours and describe energy required at each wavelength to produce a specified dye concentration in the photographic paper.

36. The method of claim 1, where the paper spectral sensitivities include dye-exposure transfer characteristics which describe an amount of dye produced for a given channel as a function of the log integrated exposure for that channel.

37. The method of claim 1, further comprising estimating dye absorption curves for the photographic paper, where estimating the dye absorption curves comprises:
   measuring a paper base spectrum of the photographic paper;
   measuring a paper target spectrum of a paper target having steps in each of the photographic paper's colorant channels;
   converting the paper base spectrum and the paper target spectrum to absorption spectra; and
   applying factor analysis and target rotation to the absorption spectra to produce dye absorption curves.

38. The method of claim 37, where the target rotation is controlled using eigenvalues of the absorption spectra of the paper target for each colorant.

39. The method of claim 1, further comprising determining C-logE curves which are plots of dye concentration versus log integrated exposure for colorant channels, and determining C-logE curves comprises:
   printing a neutral step wedge having gray samples in substantially discrete steps from low to high density on the photographic paper;
   measuring curve reflectance spectra of the samples of the printed neutral step wedge;
   measuring curve transmissive spectra of the samples of the printed neutral step wedge;
   determining a log integrated exposure for each sample of the printed neutral step wedge;
   determining dye absorptivities of the photographic paper;
   determining dye concentrations for each sample of the printed neutral step wedge using the determined dye absorptivities;
   applying a spline fitting function to paired dye concentrations and log integrated exposures to produce splines; and
   resampling the splines with uniform spacing to produce the C-logE curves.

40. The method of claim 1, further comprising deriving spectral sensitivities of the photographic paper, where deriving the spectral sensitivities of the photographic paper comprises iteratively adjusting the derived spectral sensitivities and log integrated exposures until a spectral sensitivity stopping criterion is met.

41. A method of predicting a reflectance spectrum of a photographic print based on a photographic negative, comprising:
   estimating a film spectral transmittance of a photographic negative;
   estimating an exposure illumination spectrum of a printing illuminant over time;
   estimating spectral sensitivities of photographic paper corresponding to the photographic print;
   estimating dye concentrations based on the film spectral transmittance, the exposure illumination spectrum, and the spectral sensitivities;
   converting the estimated dye concentrations to a predicted reflectance spectrum of the photographic print corresponding to the photographic negative.

42. A method of predicting a reflectance spectrum of a photographic print based on a photographic negative, comprising:
   estimating a film spectral transmittance of a photographic negative using a scanner and film model;
   estimating an exposure illumination spectrum of a printing illuminant over time using a photographic printer model;
   estimating spectral sensitivities of photographic paper corresponding to the photographic print using a photographic paper model;
   estimating dye concentrations based on the film spectral transmittance, the exposure illumination spectrum, and the spectral sensitivities using the photographic paper model;
   converting the estimated dye concentrations to a predicted reflectance spectrum of the photographic print using the photographic paper model.

43. A method of modeling spectral characteristics of a photographic print based on a photographic negative, comprising:
   converting digital values representative of the photographic negative to a film transmittance spectrum;
   determining an exposure illumination spectrum for generation of the photographic print;
   determining paper spectral sensitivities of a photographic paper for generation of the photographic print;
   generating log integrated exposures based on a time integrated spectral product of the film transmittance spectrum, the exposure illumination spectrum, and the paper spectral sensitivities;

generating dye concentrations based on the log integrated exposures; and generating a predicted reflectance spectrum based on the dye concentrations.

44. A method of modeling spectral characteristics of a photographic print based on a photographic negative, comprising:

converting digital values representative of the photographic negative to a film transmittance spectrum using a selected photographic negative model;

determining an exposure illumination spectrum for generation of the photographic print using a selected illuminant model and a selected print filter model;

determining paper spectral sensitivities of a photographic paper for generation of the photographic print using a selected photographic paper model;

generating log integrated exposures based on a time integrated spectral product of the film transmittance spectrum, the exposure illumination spectrum, and the paper spectral sensitivities;

generating dye concentrations based on the log integrated exposures; and generating a predicted reflectance spectrum based on the dye concentrations using a selected paper dye model and the selected photographic paper model.

45. A method of modeling spectral characteristics of a photographic print based on a photographic negative, comprising:

converting digital values from scanning a photographic negative to a film transmittance spectrum using a photographic negative film model corresponding to a media of the photographic negative, by iteratively updating media coordinates corresponding to an estimated spectrum until a stopping criterion is met, where the media coordinates are in a colorant space of a sample scanned by an image acquisition device;

estimating an exposure illumination spectrum over time using an exposure schedule;

estimating paper spectral sensitivities of a photographic paper corresponding to the photographic print;

integrating spectral products of the film transmittance spectrum, the exposure illumination spectrum, and the paper spectral sensitivities;

converting the integrated spectral products into log integrated exposures;

converting the log integrated exposures to dye concentrations; and converting the dye concentrations to a predicted reflectance spectrum.

46. The method of claim 45, where iteratively updating the media coordinates is constrained using a media model corresponding to the sample with a constrained minimization process.

47. A method of modeling spectral characteristics of a photographic print based on a photographic negative, comprising:

converting digital values from scanning a photographic negative to a film transmittance spectrum using a photographic negative film model corresponding to a media of the photographic negative;

estimating an exposure illumination spectrum over time using an exposure schedule;

estimating paper spectral sensitivities of a photographic paper corresponding to the photographic print;

integrating spectral products of the film transmittance spectrum, the exposure illumination spectrum, and the paper spectral sensitivities;

converting the integrated spectral products into log integrated exposures;

iteratively adjusting the derived spectral sensitivities and log integrated exposures until a spectral sensitivity stopping criterion is met;

converting the log integrated exposures to dye concentrations; and converting the dye concentrations to a predicted reflectance spectrum.

48. A method of modeling spectral characteristics of a photographic print based on a photographic negative, comprising:

converting digital values from scanning a photographic negative to a film transmittance spectrum using a photographic negative film model corresponding to a media of the photographic negative;

estimating an exposure illumination spectrum over time using an exposure schedule;

estimating paper spectral sensitivities of a photographic paper corresponding to the photographic print;

integrating spectral products of the film transmittance spectrum, the exposure illumination spectrum, and the paper spectral sensitivities;

converting the integrated spectral products into log integrated exposures;

estimating dye absorption curves for the photographic paper, where estimating the dye absorption curves comprises:

measuring a paper base spectrum of the photographic paper;

measuring a paper target spectrum of a paper target having steps in each of the photographic paper's colorant channels;

converting the paper base spectrum and the paper target spectrum to absorption spectra; and applying factor analysis and target rotation to the absorption spectra to produce dye absorption curves;

converting the log integrated exposures to dye concentrations based on the dye absorption curves; and converting the dye concentrations to a predicted reflectance spectrum.

49. A computer program, residing on a computer-readable medium, for modeling spectral characteristics of a photographic print based on a photographic negative, the computer program comprising instructions for causing a computer to:

convert digital values from scanning a photographic negative to a film transmittance spectrum using a photographic negative film model corresponding to a media of the photographic negative;

estimate an exposure illumination spectrum over time using an exposure schedule;

estimate paper spectral sensitivities of a photographic paper corresponding to the photographic print;

integrate over time spectral products of the film transmittance spectrum, the exposure illumination spectrum, and the paper spectral sensitivities;

convert the integrated spectral products into log integrated exposures;

convert the log integrated exposures to dye concentrations; and convert the dye concentrations to a predicted reflectance spectrum.

50. In a computer system, a spectral model for modeling spectral characteristics of a photographic print based on a photographic negative, comprising:

means for converting digital values from scanning a photographic negative to a film transmittance spectrum using a photographic negative film model corresponding to a media of the photographic negative;

means for estimating an exposure illumination spectrum over time using an exposure schedule;

means for estimating paper spectral sensitivities of a photographic paper corresponding to the photographic print;

means for integrating over time spectral products of the film transmittance spectrum, the exposure illumination spectrum, and the paper spectral sensitivities;

means for converting the integrated spectral products into log integrated exposures;

means for converting the log integrated exposures to dye concentrations; and means for converting the dye concentrations to a predicted reflectance spectrum.

* * * * *